US008285287B2

(12) United States Patent
Kono

(10) Patent No.: US 8,285,287 B2
(45) Date of Patent: Oct. 9, 2012

(54) WIRELESS COMMUNICATION TERMINAL, PROGRAM AND COMMUNICATION METHOD

(75) Inventor: Kenji Kono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1484 days.

(21) Appl. No.: 11/572,695

(22) PCT Filed: Jul. 25, 2005

(86) PCT No.: PCT/JP2005/013589
§ 371 (c)(1),
(2), (4) Date: Jul. 16, 2007

(87) PCT Pub. No.: WO2006/011452
PCT Pub. Date: Feb. 2, 2006

(65) Prior Publication Data
US 2008/0119183 A1 May 22, 2008

(30) Foreign Application Priority Data

Jul. 28, 2004 (JP) .............................. P.2004-220610
Jul. 29, 2004 (JP) .............................. P.2004-221804

(51) Int. Cl.
*H04W 36/16* (2009.01)
*H04W 36/36* (2009.01)
*H04W 4/00* (2009.01)
*H04M 1/00* (2006.01)
(52) U.S. Cl. ..................... 455/437; 455/436; 455/552.1; 370/331
(58) Field of Classification Search .......... 455/436–444, 455/448, 452.2; 370/331–334
See application file for complete search history.

(56) References Cited

U.S. PATENT DOCUMENTS

| 5,436,956 | A | * | 7/1995 | Shiotsuki et al. | ............. | 455/441 |
| 6,088,335 | A | * | 7/2000 | I et al. | ............................ | 370/252 |
| 6,243,582 | B1 | * | 6/2001 | Lahtinen | ....................... | 455/436 |
| 6,393,276 | B1 | * | 5/2002 | Vanghi | ....................... | 455/422.1 |
| 6,728,217 | B1 | * | 4/2004 | Amirijoo et al. | .............. | 370/252 |

(Continued)

FOREIGN PATENT DOCUMENTS

EP  1246492  10/2002

(Continued)

OTHER PUBLICATIONS

Japanese Patent Application No. 2004-221804, Office Action, issued Jan. 19, 2010.

(Continued)

*Primary Examiner* — Matthew Sams
(74) *Attorney, Agent, or Firm* — Procopio, Cory, Hargreaves & Savitch LLP

(57) ABSTRACT

A wireless communication terminal including: a switching section for switching between a first communication system in which an upper limit value of a transmission rate varies and a second communication system; a reception section for receiving an information indicating the upper limit value of the transmission rate in the first communication system, from a base station; a comparison section for making a comparison between the upper limit value received by the reception section and a predetermined reference value, either at a communication start time or during communication with the base station in the first communication system; and a control section for performing switching control of the switching section so as to perform communication in the second communication system when the upper limit value is lower than the reference value as a result of the comparison by the comparison section.

24 Claims, 17 Drawing Sheets

U.S. PATENT DOCUMENTS

| | | | |
|---|---|---|---|
| 6,745,049 B1 * | 6/2004 | Uchida et al. | 455/560 |
| 6,889,050 B1 * | 5/2005 | Willars et al. | 455/452.2 |
| 7,349,368 B2 * | 3/2008 | Uchida et al. | 370/328 |
| 7,457,623 B2 * | 11/2008 | Naghian et al. | 455/439 |
| 7,574,211 B2 * | 8/2009 | Hata | 455/436 |
| 7,620,401 B2 * | 11/2009 | Oh | 455/441 |
| 7,693,110 B2 * | 4/2010 | Love et al. | 370/332 |
| 2001/0030948 A1 * | 10/2001 | Tiedemann, Jr. | 370/305 |
| 2002/0077110 A1 * | 6/2002 | Ishikawa et al. | 455/452 |
| 2004/0162083 A1 * | 8/2004 | Chen et al. | 455/454 |
| 2004/0176090 A1 * | 9/2004 | Mudigonda et al. | 455/434 |
| 2006/0234707 A1 | 10/2006 | Byun et al. | |

FOREIGN PATENT DOCUMENTS

| | | |
|---|---|---|
| JP | 2000-333232 | 11/2000 |
| JP | 2001119741 | 4/2001 |
| JP | 2004-032077 | 1/2004 |
| WO | WO 02/01763 | 1/2002 |
| WO | 2004-059886 | 7/2004 |

OTHER PUBLICATIONS

CDMA 2000 High Rate Packet Data Air Interface Specification 3GPP2 C.S0024-A Version 1.0, pp. 11-143-11-148, pp. 13-51-13-53 (Mar. 2004).

* cited by examiner

FIG. 2

| UP/DOWN | CHANGE DATA RATE | VALUE OF α (1/255) |
|---|---|---|
| DATA RATE UP | 9.6kbps→19.2kbps | 0×30 (48) |
| | 19.2kbps→38.4kbps | 0×10 (16) |
| | 38.4kbps→76.8kbps | 0×08 (8) |
| | 76.8kbps→153.6kbps | 0×08 (8) |
| DATA RATE DOWN | 153.6kbps→76.8kbps | 0×FF (255) |
| | 76.8kbps→38.4kbps | 0×20 (32) |
| | 38.4kbps→19.2kbps | 0×10 (16) |
| | 19.2kbps→9.6kbps | 0×10 (16) |

WHEN BASE STATION IS ADDED

WHEN BASE STATION IS DELETED

WIRELESS COMMUNICATION TERMINAL, PROGRAM AND COMMUNICATION METHOD

TECHNICAL FIELD

The present invention relates to a wireless communication terminal, a program and a communication method, for performing communication by switching a plurality of communication systems.

The present invention also relates to a wireless communication terminal, a program and a communication method, in such a communication system that varies a transmission rate according to the congestion state of a base station.

BACKGROUND ART

A wireless communication terminal capable of switching two or more communication systems to perform communication with a base station is known.

Known as such a wireless communication terminal capable of performing communication in a plurality of communication systems is, for example, a wireless communication terminal capable of switching between a CDMA2000 1x system intended mainly for voice communication and a CDMA 2000 1xEVDO system used only for data communication, to perform communication using a common antenna (which will be hereinafter referred to as dual system) (for example, refer to patent document 1).

The CDMA 2000 1xEVDO system is a next-generation high-speed wireless communication system, and is standardized in Std.T-64 IS-2000 C.S. 0024 "CDMA2000 High Rate Packet Data Air Interface Specification" in Association of Radio Industries and Businesses ARIB as a system provided by standardizing HDR (High Data Rate) system, provided by U.S.A. QUALCOMM Incorporated, which is an expansion system of the CDMA2000 1x system. The CDMA 2000 1xEVDO system is a system intended for improving the transmission rate by expanding CDMAOne system served by KDDI CORPORATION in Japan at present (ARIBT-53 in Japan, EIA/TIA/IS-95 in North America, Republic of Korea, etc., and the like), and by specializing the CDMA2000 1x system further in data communication, that is made compatible with the third-generation system (3G).

"EV" of CDMA2000 1xEVDO means Evolution and "DO" means Data Only (refer to patent document 2).

In the communication system using such a dual system wireless communication terminal, the CDMA2000 1xEVDO system can vary the upper limit of the transmission rate according to the congestion state of a base station.

The wireless communication terminal in the communication system performs communication based on the upper limit.

For example, for the upper limit value of the transmission rate of communication from the wireless communication terminal to a base station (uplink communication), the lowest speed is selected at the communication start time. After this, the wireless communication terminal changes the transmission rate based on instruction information that instructs to increase or decrease the upper limit value of the transmission rate transmitted from the base station at every predetermined timing.

The base station may transmit urgent information for limiting the upper limit value of the transmission rate to the wireless communication terminal, aside from the information transmitted from the base station at every predetermined timing.

In this case, the wireless communication terminal changes the transmission rate to a limit value based on the received urgent information.

Such urgent information is transmitted in a situation in which it is feared that the base station may become down if the transmission rate is not dropped, such as in a case where a large number of wireless communication terminals are connected and concentrated to one base station up to nearly the limit of the connection permissible amount of the base station (the base station is in a congestion state), for example.

Thus, in the CDMA2000 1xEVDO system, the upper limit value of the transmission rate at least in the uplink communication varies.

Further, in the dual system wireless communication terminal, if the radio wave state between the wireless communication terminal and the base station becomes poor during communication in the CDMA2000 1xEVDO system, the antenna can be switched so as to perform communication by using the CDMA200 1x system which is the other communication system.

Thus, if the wireless communication terminal determines that satisfactory communication cannot be performed by using the CDMA2000 1xEVDO system because the radio wave state becomes poor, the CDMA2000 1xEVDO system can be switched to the CDMA200 1x system to continue the communication.

Switching of communication from the CDMA2000 1xEVDO system to the CDMA200 1x system is called "hand down."

In a wireless communication system including wireless communication terminals and base stations, such as a cellular communication system, an art is proposed wherein a base station to which a wireless communication terminal connects for performing communication (which will be hereinafter referred to as "connecting base station"), and one or more base stations adjacent to the connecting base station that become candidates of handoff destination (which will be hereinafter referred to as "peripheral base station") each instruct to increase or decrease the transmission rate based on the congestion degree of the base station, and the wireless communication terminal varies the transmission rate based on the instruction for performing communication control.

In this specification, handoff means switching of the connecting base station.

In the communication control, if all of the connecting base station and the peripheral base stations as candidates of handoff destination is low in the congestion degree and all base stations instruct to increase the transmission rate, the wireless communication terminal operates so as to increase the transmission rate; on the other hand, if one of the base stations is high in the congestion degree and instructs to lower the transmission rate, the wireless communication terminal operates so as to lower the transmission rate.

As the control is thus performed, the transmission rate is matched with that of the congested base station among the connecting base station and all peripheral base stations, so that when the handoff is made from the base station low in the congestion degree and high in the transmission rate to the base station high in the congestion degree and low in the transmission rate, occurrence of an error such as packet loss caused by a rapid decrease in the transmission rate can be prevented.

Patent document 1: Refer to JP-A-2003-298762
Patent document 2: Refer to JP-A-2002-300644

DISCLOSURE OF THE INVENTION

Problems to be Solved by the Invention

In the dual system wireless communication terminal as described above, the transmission rate is varied based on the instruction information of an increase or a decrease in the transmission rate transmitted from the base station at every predetermined timing and the urgent information for limiting the upper limit value of the transmission rate transmitted from the base station. In this case, depending on the situation of the base station, the transmission rate may not be increased from the communication start time (the lowest speed), or the once increased transmission rate is decreased according to an instruction of the upper limit value from the base station and the transmission rate may remain in the state and does not increase.

Specifically, as the base station abruptly becomes congested, instruction information to "lower" the transmission rate may be transmitted again and again consecutively at every predetermined timing from the base station, or a connection may be made to the heavily congested base station and information for limiting the transmission rate may be transmitted continuously, or the like.

Under these circumstances, communication at low speed (for example, at the lowest speed) continues and therefore if the CDMA2000 1xEVDO system is switched to the CDMA200 1x system which is the other communication system, for performing communication with the CDMA2000 1x base station, the possibility that the transmission rate may be improved is high. However, hand down depends on the radio wave state between the wireless communication terminal and the base station as described above, and therefore hand down cannot be accomplished at a desired timing. Thus, the throughput of communication in the CDMA2000 1xEVDO system is lowered; this is a problem.

If handoff communication control is performed as described above, when any one of the connecting base station and one or more peripheral base stations as candidates of handoff destination is simply congested, the transmission rate cannot be increased and the throughput worsens even if other base stations are low in the congestion degree; this is a problem.

This becomes a problem particularly in a case where handoff does not have to be considered but the transmission rate is desired to be increased preferentially since there is no possibility of moving to another cell, such as when the user places the wireless communication terminal on a table, etc., and receives a bit stream of streaming video requiring the real time property, for example.

It is therefore an object of the invention to enhance the throughput of a wireless communication terminal that can perform communication in a plurality of communication systems.

Means for Solving the Problems

The gist of the invention to solve the problems described above is described in the following:
A wireless communication terminal comprising:
a switching section for switching between a first communication system in which an upper limit value of a transmission rate varies and a second communication system;
a reception section for receiving an information indicating the upper limit value of the transmission rate in the first communication system, from a base station;
a comparison section for making a comparison between the upper limit value received by the reception section and a predetermined reference value, either at a communication start time or during communication with the base station in the first communication system; and
a control section for performing switching control of the switching section so as to perform communication in the second communication system when the upper limit value is lower than the reference value as a result of the comparison by the comparison section.

A wireless communication terminal comprising:
a switching section for switching between a first communication system in which an upper limit value of a transmission rate varies and a second communication system;
a reception section for receiving an instruction information that instructs to vary the upper limit value of the transmission rate in the first communication system, at every predetermined timing from a base station;
a determination section for determining whether or not the instruction information that instructs to lower the upper limit value of the transmission rate is received successively for equal to or more than a predetermined number of times during communication with the base station in the first communication system; and
a control section for performing switching control of the switching section so as to perform communication in the second communication system when the instruction information that instructs to lower the upper limit value of the transmission rate is received successively for equal to or more than the predetermined number of times as a result of the determination by the determination section.

In the wireless communication terminal, the control section performs the switching control of the switching section when the instruction information that instructs to lower the upper limit value of the transmission rate is received successively for equal to or more than the predetermined number of times as the result of the determination by the determination section, and only when the upper limit value of the transmission rate in the first communication system is lower than a predetermined reference value.

In the wireless communication terminal, the reference value is a value at which it is expected that the transmission rate will increase when communication is performed in the second communication system rather than in the first communication system.

The wireless communication terminal comprising:
a derivation section for deriving a remaining amount of data to be transmitted in the first communication system, wherein the control section performs the switching control to the second communication system when the upper limit value is lower than the reference value as the result of the comparison by the comparison section, and only when the remaining data amount derived by the derivation section is larger than a predetermined amount.

The wireless communication terminal comprising:
a derivation section for deriving the remaining amount of data to be transmitted in the first communication system, wherein the control section performs the switching control to the second communication system when the instruction information that instructs to lower the upper limit value of the transmission rate is received successively for equal to or more than the predetermined number of times as the result of the determination by the determination section, and only when the remaining data amount derived by the derivation section is larger than a predetermined amount comprising:

A program embodied in a computer readable medium which enables a computer to perform a process, the program being used with a wireless communication terminal in which communication is performed by switching between a first communication system in which an upper limit value of a transmission rate varies and a second communication system, the process comprising:

a first process for receiving an information indicating the upper limit value of the transmission rate in the first communication system, from a base station;

a second process for making a comparison between the upper limit value received by the reception section and a predetermined reference value, either at a communication start time or during communication with the base station in the first communication system; and a third process for switching from the first communication system to the second communication system when the upper limit value is lower than the reference value as a result of the comparison by the second process.

A program embodied in a computer readable medium which enables a computer to perform a process, the program being used with a wireless communication terminal in which communication is performed by switching between a first communication system in which an upper limit value of a transmission rate varies and a second communication system, the process comprising:

a first process for receiving an instruction information that instructs to vary the upper limit value of the transmission rate in the first communication system, at every predetermined timing from a base station;

a second process for determining whether or not the instruction information that instructs to lower the upper limit value of the transmission rate is received successively for equal to or more than a predetermined number of times during communication with the base station in the first communication system; and a third process for switching from the first communication system to the second communication system when the instruction information that instructs to lower the upper limit value of the transmission rate is received successively for equal to or more than the predetermined number of times as a result of the determination by the second process.

In the program, in the third process, the switching from the first communication system to the second communication system is made when the instruction information that instructs to lower the upper limit value of the transmission rate is received successively for equal to or more than the predetermined number of times as the result of the determination by the second process, and only when the upper limit value of the transmission rate in the first communication system is lower than a predetermined reference value.

In the program, the reference value is a value at which it is expected that the transmission rate will increase when communication is performed in the second communication system rather than in the first communication system.

In the program, the process comprising:

a fourth process for deriving a remaining amount of data to be transmitted in the first communication system, wherein in the third process, the switching from the first communication system to the second communication system is made when the upper limit value is lower than the reference value as the result of the comparison by the second process, and only when the remaining data amount derived by the fourth process is larger than a predetermined amount.

In the program, the process comprising:

fourth process for deriving a remaining amount of data to be transmitted in the first communication system, wherein in the third process, the switching from the first communication system to the second communication system is made when the instruction information that instructs to lower the upper limit value of the transmission rate is received successively for equal to or more than the predetermined number of times as the result of the determination by the second process, and only when the remaining data amount derived by the fourth process is larger than a predetermined amount.

A communication method for performing communication in a wireless communication terminal by switching between a first communication system in which an upper limit value of a transmission rate varies and a second communication system, the communication method comprising:

receiving an information indicating the upper limit value of the transmission rate in the first communication system, from a base station;

making a comparison between the upper limit value received from the base station and a predetermined reference value, either at a communication start time or during communication with the base station in the first communication system; and switching from the first communication system to the second communication system when the upper limit value is lower than the reference value as a result of the comparison.

A communication method for performing communication in a wireless communication terminal by switching between a first communication system in which an upper limit value of a transmission rate varies and a second communication system, the communication method comprising:

receiving an instruction information that instructs to vary the upper limit value of the transmission rate in the first communication system, at every predetermined timing from a base station;

determining whether or not the instruction information that instructs to lower the upper limit value of the transmission rate is received successively for equal to or more than a predetermined number of times during communication with the base station in the first communication system; and switching from the first communication system to the second communication system when the instruction information that instructs to lower the upper limit value of the transmission rate is received successively for equal to or more than the predetermined number of times as a result of the determination.

In the communication method, the switching from the first communication system to the second communication system is made when the instruction information that instructs to lower the upper limit value of the transmission rate is received successively for equal to or more than the predetermined number of times as the result of the determination, and only when the upper limit value of the transmission rate in the first communication system is lower than a predetermined reference value.

In the communication method, the reference value is a value at which it is expected that the transmission rate will increase when communication is performed in the second communication system rather than the first communication system.

The communication method comprising:
deriving a remaining amount of data to be transmitted in the first communication system when the upper limit value is lower than the reference value as the result of the comparison,
wherein only when the derived remaining data amount is larger than a predetermined amount, the switching from the first communication system to the second communication system is made.

The communication method comprising:
deriving a remaining amount of data to be transmitted in the first communication system when the instruction information that instructs to lower the upper limit value of the transmission rate is received successively for equal to or more than the predetermined number of times as the result of the determination,
wherein only when the derived remaining data amount is larger than a predetermined amount, the switching from the first communication system to the second communication system is made.

A wireless communication terminal that is connected to a connecting base station that holds an information of a peripheral base station as a candidate of handoff destination, the wireless communication terminal comprising:
a reception section for receiving an instruction information that instructs to vary an upper limit value of a transmission rate, from the peripheral base station;
a determination section for determining whether or not an instruction information that instructs to lower the upper limit value of the transmission rate is included in the instruction information received by the reception section;
a generation section for generating a signal to control the information of the peripheral base station when the instruction information that instructs to lower the upper limit value of the transmission rate is included as a result of the determination by the determination section; and
a transmission section for transmitting the signal generated by the generation section to the connecting base station.

In the wireless communication terminal, the signal to control the information of the peripheral base station includes an information to remove the base station transmitting the instruction information that instructs to lower the upper limit value of the transmission rate, from the information of the peripheral base station.

In the wireless communication terminal, the signal to control the information of the peripheral base station is a value indicating a communication quality between the base station transmitting the instruction information that instructs to lower the upper limit value of the transmission rate and the wireless communication terminal, and
the value is below a predetermined reference value.

The wireless communication terminal comprising:
a derivation section for deriving a data amount of data to be transmitted, wherein the transmission section transmits the signal to control the information of the peripheral base station to the connecting base station when the instruction information that instructs to lower the upper limit value of the transmission rate is included as the result of the determination by the determination section, and only when the data amount derived by the derivation section is larger than a predetermined value.

A program embodied in a computer readable medium which enables a computer to perform a process, the program being used with a wireless communication terminal that is connected to a connecting base station that holds an information of a peripheral base station as a candidate handoff destination, the process comprising:
a first process for receiving an instruction information that instructs to vary an upper limit value of a transmission rate, from the peripheral base station;
a second process for making a determination whether or not an instruction information that instructs to lower the upper limit value of the transmission rate is included in the instruction information received by the first process; and
a third process for transmitting a signal to control the information of the peripheral base station to the connecting base station when the instruction information that instructs to lower the upper limit value of the transmission rate is included as a result of the determination by the second process.

In the program, the signal to control the information of the peripheral base station includes an information to remove the base station transmitting the instruction information that instructs to lower the upper limit value of the transmission rate, from the information of the peripheral base station.

In the program, the signal to control the information of the peripheral base station is a value indicating a communication quality between the base station transmitting the instruction information that instructs to lower the upper limit value of the transmission rate and the wireless communication terminal, and
the value is below a predetermined reference value.

In the program, the process comprising:
a fourth process for deriving a data amount of data to be transmitted,
wherein in the third process, the signal to control the information of the peripheral base station is transmitted to the connecting base station when the instruction information that instructs to lower the upper limit value of the transmission rate is included as the result of the determination by the second process, and only when the data amount derived by the fourth process is larger than a predetermined value.

A communication method used with a wireless communication terminal that is connected to a connecting base station that holds an information of a peripheral base station as a candidate handoff destination, the communication method comprising:
receiving an instruction information that instructs to vary an upper limit value of a transmission rate, from the peripheral base station;
making a determination whether or not an instruction information to lower the upper limit value of the transmission rate is included in the instruction information received from the peripheral base station; and
transmitting a signal to control the information of the peripheral base station to the connecting base station when the instruction information that instructs to lower the upper limit value of the transmission rate is included as a result of the determination.

In the communication method, the signal to control the information of the peripheral base station includes an information to remove the base station transmitting the instruction information that instructs to lower the upper limit value of the transmission rate, from the information of the peripheral base station.

In the communication method, the signal to control the information of the peripheral base station is a value indicating a communication quality between the base station transmitting the instruction information that instructs to lower the upper limit value of the transmission rate and the wireless communication terminal, and the value is below a predetermined reference value.
The communication comprising:
deriving an amount of data to be transmitted when the instruction information that instructs to lower the upper limit value of the transmission rate is included as the result of the determination,
wherein only when the derived data amount is larger than a predetermined value, the signal to control the information of the peripheral base station is transmitted to the connecting base station.

Advantages of the Invention

According to the configurations described above, the throughput of the wireless communication terminal that can perform communication in a plurality of communication systems can be enhanced.

BRIEF DESCRIPTION OF THE DRAWINGS

FIG. 2 is a table to show a relationship between transmission rate change and threshold value α in a first embodiment of the invention.

DESCRIPTION OF REFERENCE NUMERALS

10 Antenna
20 1xRF sect in
30 DO RF section
40 RF control section
50 System control section
60 System storage section
100A, 100B, 100*a*, 100*b*, 100*c*, 101 Base station
200 Wireless communication terminal

BEST MODE FOR CARRYING OUT THE INVENTION

Figure 1:
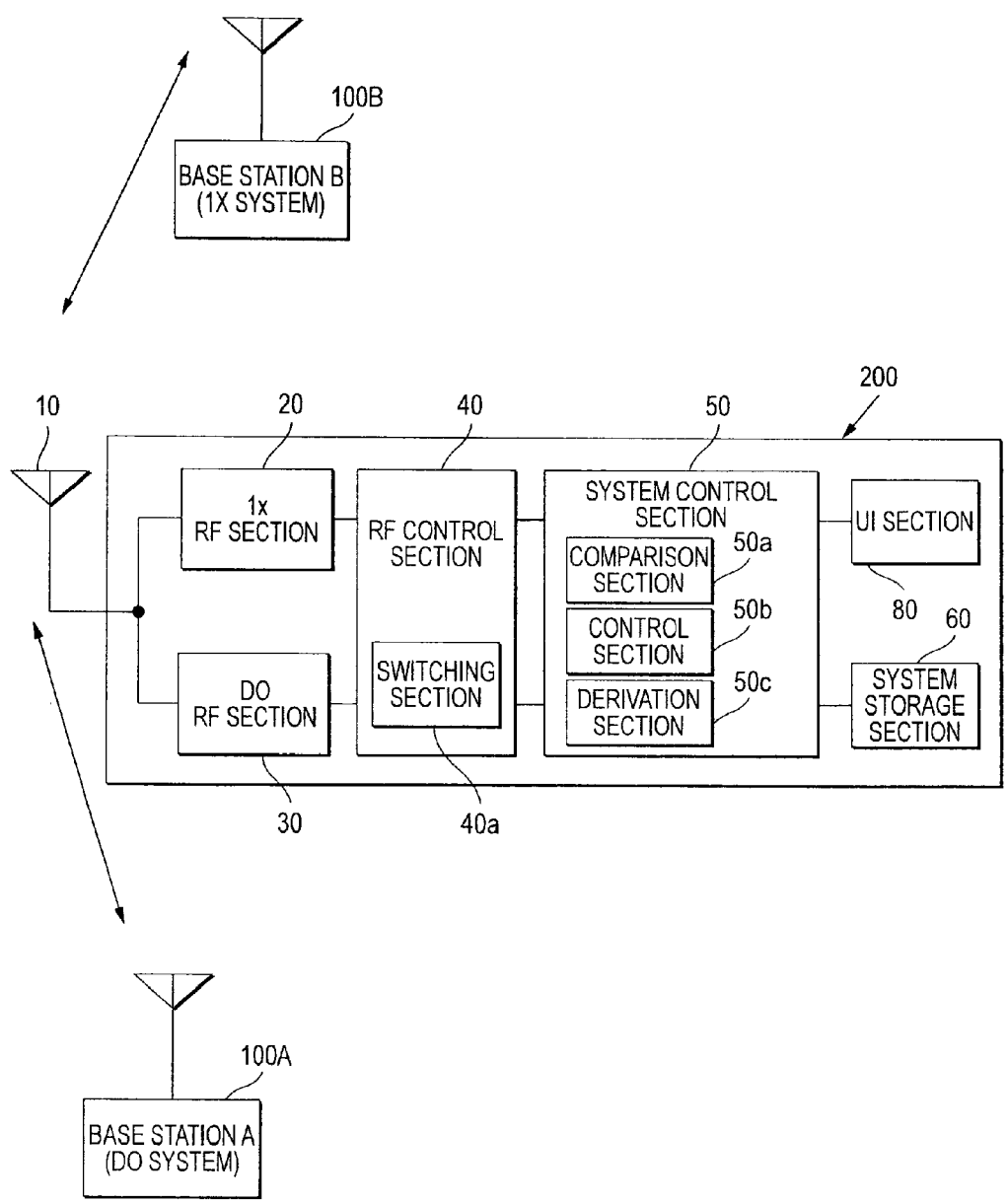
FIG. 1 is a block diagram a configuration of a wireless communication terminal of a first embodiment of the invention.

A first embodiment of the invention will be discussed below with reference to the accompanying drawings:

FIG. 1 is a block diagram showing the configuration of a wireless communication terminal 200 of the embodiment.

The wireless communication terminal (mobile telephone terminal) 200 of the embodiment is a wireless communication terminal capable of switching between a CDMA2000 1x communication system (which will be hereinafter referred to as "1x system") and a 1xEVDO communication system (which will be hereinafter referred to as "DO system") to perform data communication with a DO system base station 100A or a 1x system base station 100B, by using a common antenna 10.

The base station 100A performs DO system communication with the wireless communication terminal 200, and the base station 100B performs 1x system communication with the wireless communication terminal 200.

The antenna 10 converts a radio-frequency signal from either a 1xRF section 20 or a DO RF section 30 into a radio wave and transmits the radio wave to the base station 100A, 100B and receives a radio wave from the base station 100A, 100B and sends the radio wave to the 1xRF section 20 or the DO RF section 30 as a radio-frequency signal.

The 1xRF section 20 converts data or a voice signal transmitted in the 1x system into a radio-frequency signal and sends the radio-frequency signal to the antenna 10. It also converts a radio-frequency signal sent from the antenna 10 into a data signal or a voice signal.

The DO RF section 30 converts data transmitted in the DO system into a radio-frequency signal and sends the radio-frequency signal to the antenna 10.

It also converts a radio-frequency signal sent from the antenna 10 into a data signal.

The 1xRF section 20 or the DO RF section 30 serves as a reception section through the antenna 10.

An RF control section 40 is a control section for controlling communication of the two systems of the DO system and the 1x system and serves as a switching section described later.

A system control section 50 is a control section for performing centralized control of the sections of the wireless communication terminal 200 and serves as a comparison section, a control section, and a derivation section described later.

A system storage section 60 is implemented as a memory such as RAM and stores an application, temporary data, etc.

Next, variation of the upper limit value of transmission rate of the wireless communication terminal of the embodiment in the DO system data communication will be discussed with reference to FIGS. 2 and 3.

First, in uplink communication in the DO system, the upper limit value of transmission rate is classified into five steps of 9.6 kbps, 19.2 kbps, 38.4 kbps, 76.8 kbps, and 153.6 kbps.

When the wireless communication terminal 200 starts uplink communication with the base station 100A, first the wireless communication terminal starts communication at the lowest transmission rate (9.6 kbps) and then the wireless communication terminal 200 receives "RABit" (Reverse Activity Bit), which is instruction information to increase or decrease the upper limit value of the transmission rate transmitted at every predetermined timing from the base station 100A, and adjusts the transmission rate.

The RABit is a bit value that varies depending on the congestion state of the base station 100A to which the wireless communication terminal 200 connects and the congestion state of the peripheral base stations that the wireless communication terminal 200 takes as the handoff objects from the base station 100A.

Congestion of the base station refers to a case where a large number of wireless communication terminals connect to the base station in a concentrated manner, a case where a congestion occurs in the communication line, or the like.

If there is no congested base station, namely, if the transmission rate can be increased, the RABit is set to "0."

If one or more congested base stations exist, namely, if it is unpreferable to increase the transmission rate, the RABit is set to "1."

Figure 3:
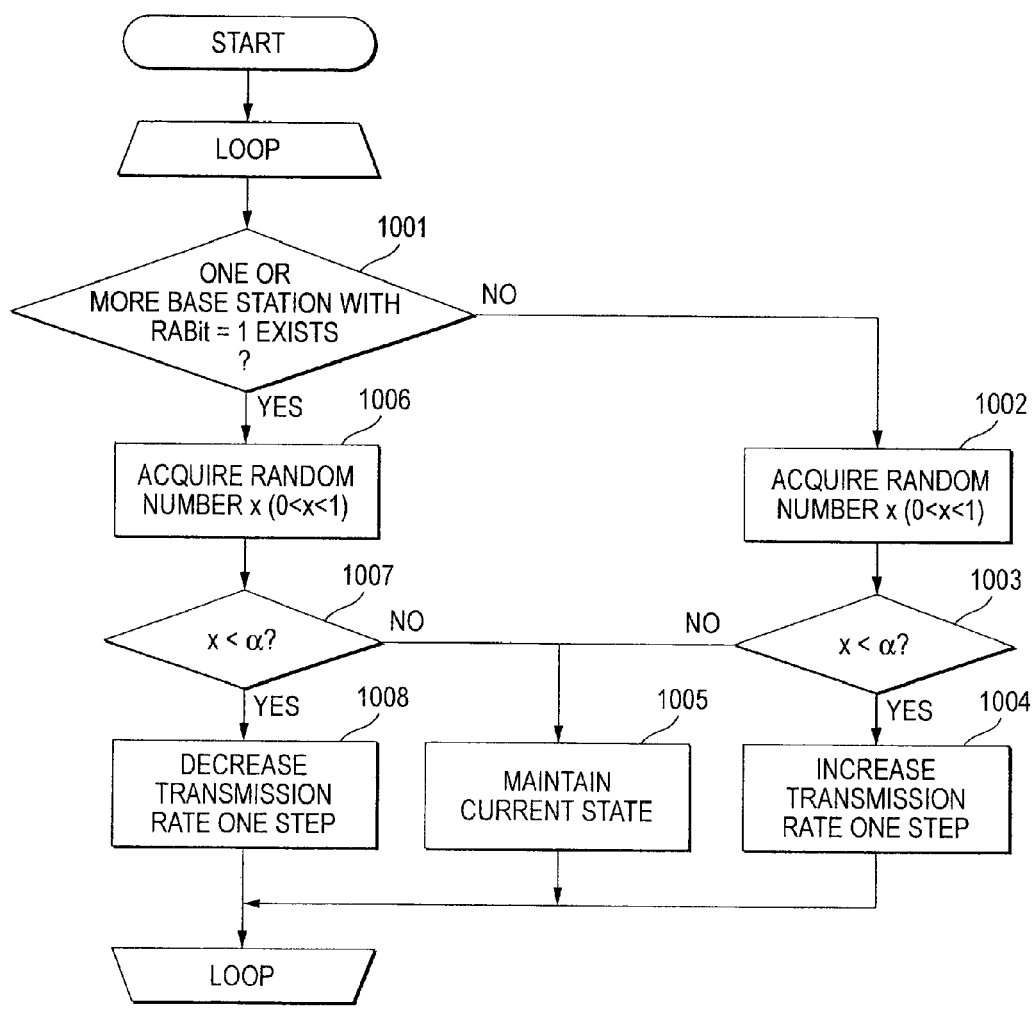
FIG. 3 is a flowchart of transmission rate change in a first embodiment of the invention.

FIG. 3 is a flowchart of transmission rate change executed by the system control section 50 of the wireless communication terminal 200.

When the wireless communication terminal 200 starts uplink communication in the DO system, first the wireless communication terminal starts communication at the lowest transmission rate (9.6 kbps).

Then, when the antenna 10 receives RABit from the base station 100A, whether or not the RABit set to "1" exists is determined (step 1001). If it is determined that the RABit is "0," the operation is performed so as to increase the upper limit value of the current transmission rate by one step.

In this case, the transmission rate is increased probabilistically rather than absolutely.

That is, first, a random number x (which is in the range of 0<x<1) is generated (step 1002).

Whether or not the generated random number x is smaller than a threshold value α to change the transmission rate is determined (step 1003).

Here, the threshold value α varies depending on the current transmission rate as shown in FIG. 2. For example, when an attempt is made to increase the transmission rate one step from 9.6 kbps to 19.2 kbps, the threshold value (becomes the value resulting from dividing "0x30" (hexadecimal notation), namely, "48" by 255, namely, 48/255. In the example, at step 1003, whether or not the random number x is larger than or smaller than 48/255 is determined.

If it is determined at step 1003 that the random number x is smaller than the threshold value α, the upper limit value of the current transmission rate is increased one step (step 1004). For example, if the current transmission rate is 9.6 kbps, it is changed to 19.2 kbps, one step up. On the other hand, if it is determined that the random number x is equal to or larger than the threshold value α, the upper limit value of the current transmission rate is maintained (step 1005). For example, if the current transmission rate is 9.6 kbps, it remains in 9.6 kbps.

On the other hand, if it is determined at step 1001 that there is one base station with the RABit set to "1," the operation is performed so as to lower the upper limit value of the current transmission rate by one step. That is, first, a random number x (which is in the range of 0<x<1) is generated (step 1006) and a comparison is made between the random number x and the threshold value α (step 1007).

If it is determined that the random number x is smaller than the threshold value α, the upper limit value of the current transmission rate is decreased one step (step 1008).

For example, if the current transmission rate is 19.2 kbps, it is changed to 9.6 kbps, one step down. On the other hand, if it is determined that the random number x is equal to or larger than the threshold value α, the upper limit value of the current transmission rate is maintained (step 1005).

For example, if the current transmission rate is 19.2 kbps, it remains in 19.2 kbps.

Thus, the wireless communication terminal 200 can vary the upper limit value of the transmission rate probabilistically and stepwise based on the RABit transmitted at every predetermined timing from the base station 100A.

On the other hand, the transmission rate of the wireless communication terminal 200 may be forcibly changed as instructed from the base station, aside from the processing in FIG. 3 using the RABit.

In the DO system, the base station 100A may transmit a control signal called "CurrentRateLimit" aside from the RABit.

The CurrentRateLimit is a control signal transmitted urgently to the wireless communication terminal 200 if the base station 100A is heavily congested and the throughput remarkably worsens.

The signal is urgently transmitted, for example, in a situation in which it is feared that the base station 100A may become down in a case where wireless communication terminals 200 are connected and concentrated to one radio station 100A up to nearly the upper limit of the number of terminals to which the base station can connect.

The CurrentRateLimit includes information indicating any of the upper limit values of the five steps of the transmission rate, 9.6 kbps, 19.2 kbps, 38.4 kbps, 76.8 kbps, and 153.6 kbps, and the wireless communication terminal 200 receiving CurrentRateLimit sets the transmission rate to the indicated upper limit value of the transmission rate.

In so doing, upon reception of CurrentRateLimit transmitted urgently from the base station 100A, the wireless communication terminal 200 is forcibly set to the upper limit value of the transmission rate indicated in the CurrentRateLimit.

The mobile wireless communication terminal 200 of the embodiment can switch the antenna so as to perform communication in the 1x system which is the other communication system if the radio wave state between the wireless communication terminal and the base station becomes poor (for example, the pilot signal strength (RSSI value) lowers) during the communication in the DO system.

In so doing, if the wireless communication terminal determines that satisfactory communication in the DO system would be unable to be performed because of worsening of the radio wave state, etc., the wireless communication terminal can continue the communication by switching from the DO system to the 1x system.

The switching of communication from the DO system to the 1x system is called "hand down."

As for the uplink communication in the 1x system, at the communication start time, the transmission rate is 9.6 kbps as with the DO system, but the upper limit value of the transmission rate is always defined as 76.8 kbps and is not stepwise increased or decreased.

Next, hand down process of the wireless communication terminal 200 of the first embodiment of the invention when RABit is transmitted from the base station 100A will be discussed.

Figure 4:
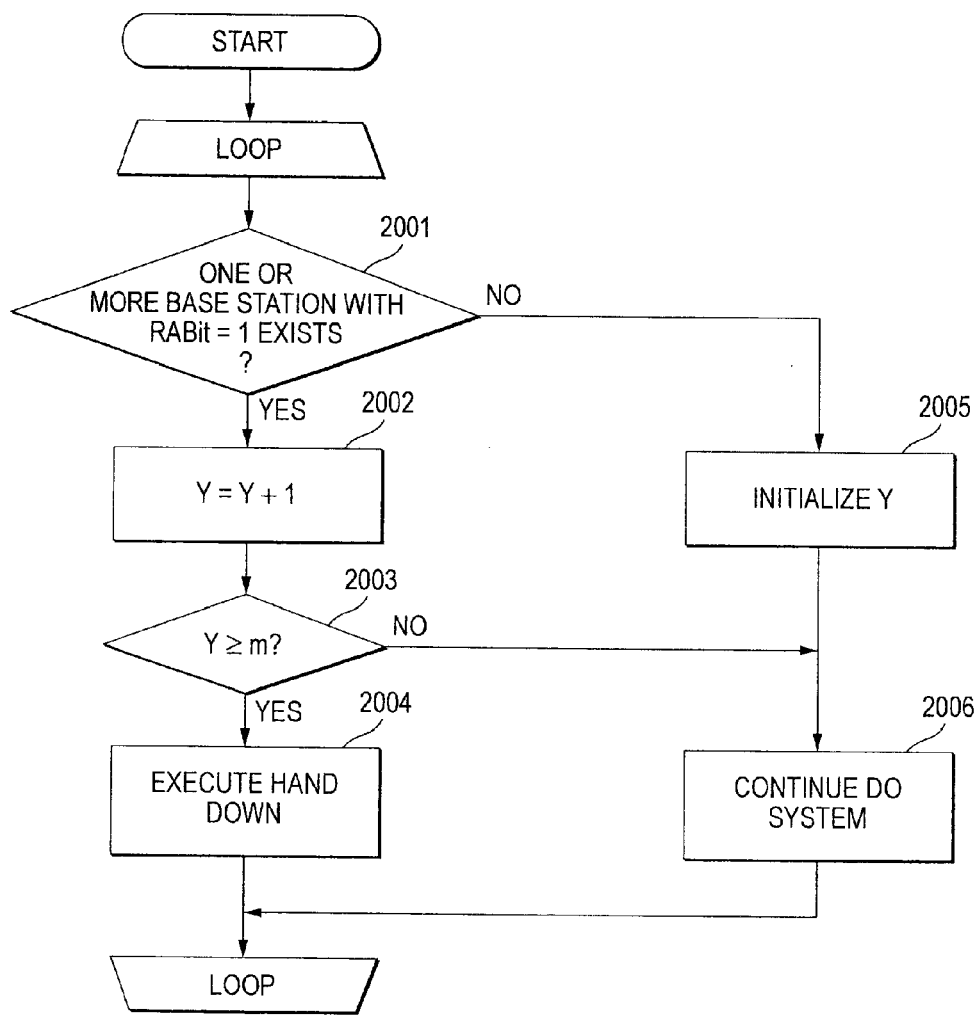
FIG. 4 is a flowchart to show hand down process in a first embodiment of the invention.

FIG. 4 is a flowchart to show the hand down process executed by the system control section 50 of the wireless communication terminal 200 of the first embodiment of the invention.

When the DO RF section 30 as a reception section receives RABit through the antenna 10 while the wireless communication terminal 200 is performing uplink communication in the DO system, the system control section 50 determines whether or not a base station, even one base station, with the RABit set to "1" exists or not (step 2001).

If it is determined that the base station, even one base station, with the RABit set to "1" exits, the system control section 50 as the determination section adds one to a variable "Y" (step 2002).

The variable Y is a value indicating the cumulative number of times that the RABit with the bit value "1" has been received successively.

Next, whether or not the variable Y is equal to or greater than a predetermined threshold value m is determined (step 2003).

If it is determined that the variable Y is equal to or greater than the threshold value m, namely, if it is determined that the RABit with the bit value "1" has been received successively for a predetermined number of times (threshold value m) or more, the system control section 50 as the control section sends a command to the RF control section 40 for switching the RF control section 40 as the switching section to execute hand down from the DO system to the 1x system (step 2004).

In so doing, communication in the 1x system starts.

On the other hand, if it is determined at step 2001 that there is no base station with the RABit set to "1," the variable Y is set to an initial value of 0 (step 2005) and the communication in the DO system is continued without executing hand down (step 2006).

If it is determined at step 2003 that the variable Y is less than the predetermined threshold value m, the communication in the DO system is also continued without executing hand down (step 2006).

After step 2004 or step 2006, the flowchart is looped to step 2001.

The threshold value m to be compared with the variable Y of the cumulative number of times that the RABit set to "1" has been received is preset to a number of times such that it is assumed that it is difficult to increase any more the transmission rate for a while because the DO system is congested and communication can be performed at higher speed if the DO system is switched to the 1x system for performing communication.

For example, if the threshold value m is set to "3" or "4," when the RABit set to "1" is transmitted only once (when the RABit is restored to "0" immediately after the RABit is set to "1" because traffic concentrates on the base station 100A accidentally only for a moment, etc.), the communication in the DO system can be continued without executing hand down.

Figure 5:
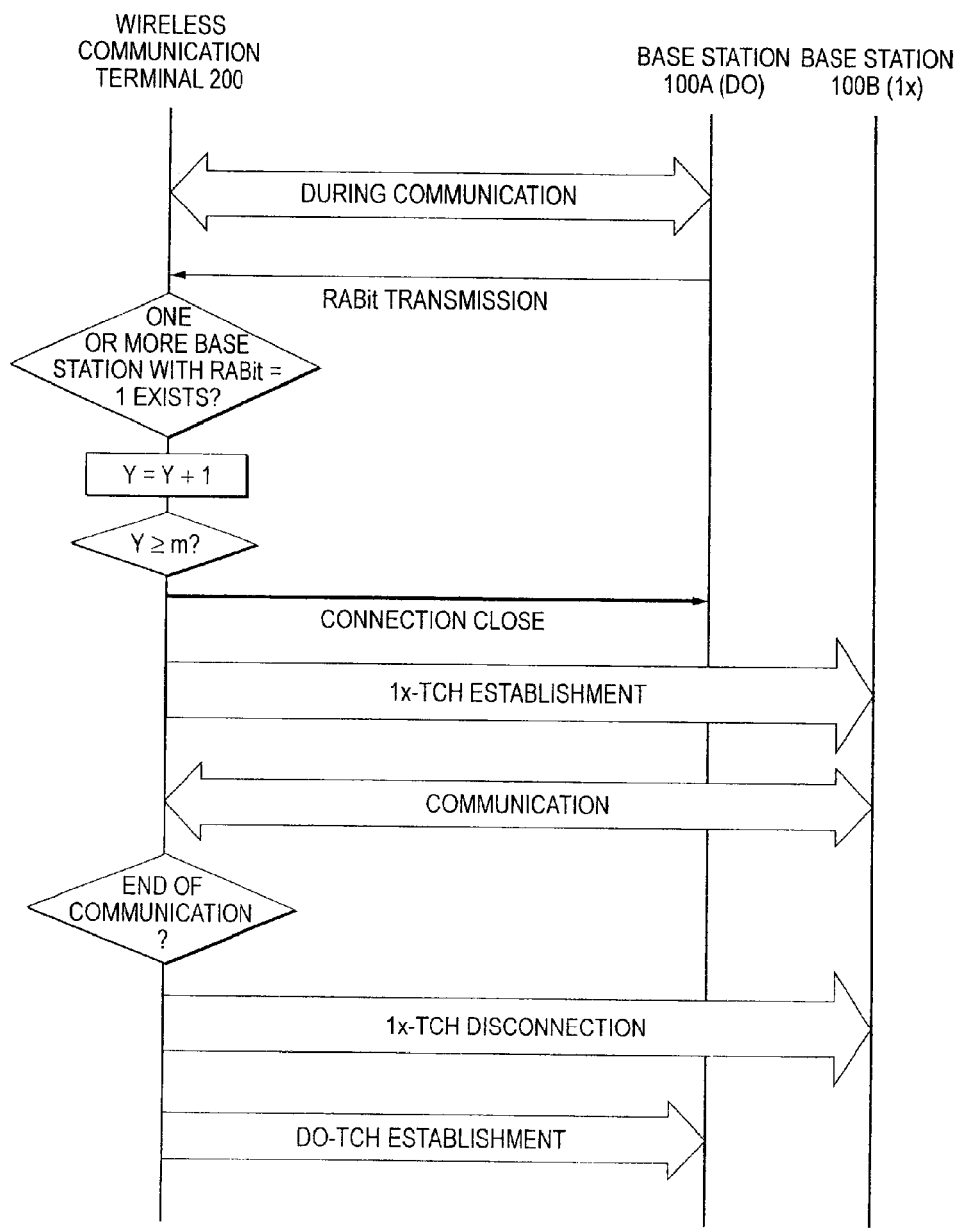
FIG. 5 is a sequence chart to show the hand down process in a first embodiment of the invention.

FIG. 5 is a sequence chart to show the hand down process executed by the system control section 50 of the wireless communication terminal 200 of the first embodiment of the invention.

While the wireless communication terminal 200 is performing uplink communication in the DO system, when the base station 100A transmits RABit and the DO RF section 30 as the reception section receives the RABit through the antenna 10, the system control section 50 determines whether or not the base station, even one base station, with the RABit set to "1" exists. If it is determined that there is one or more base stations with the RABit set to "1," one is added to the variable Y and whether or not the variable Y is equal to or greater than the threshold value m is determined.

If it is determined that the variable Y is equal to or greater than the threshold value m, the wireless communication terminal 200 transmits a "ConnectionClose message" to the base station 100A for disconnecting the communication in the DO system. Then, the wireless communication terminal 200 establishes 1x-TCH (1x system traffic channel) with the 1x system base station 100B.

After this, upon completion of the uplink communication using the 1x system, preferably 1x-TCH is disconnected and DO-TCH (DO system traffic channel) is established with the base station 100A for restoring to the communication-possible state in the DO system.

As described above, when the wireless communication terminal 200 of the first embodiment of the invention has received the RABit set to "1" successively for the predetermined number of times (threshold value m) or more during the communication in the DO system, hand down from the DO system to the 1x system is performed. In so doing, if the base station 100A is congested and communication cannot be performed at satisfactory transmission rate in the DO system, the uplink communication in the DO system are abandoned and the DO system is switched to the 1x system in which higher transmission rate can be expected for performing communication.

Consequently, the throughput of the uplink communication can be enhanced.

Next, a second embodiment of the invention will be discussed.

In the second embodiment, hand down process when RABit is transmitted from a base station 100A as in the first embodiment will be discussed. A wireless communication system of the second embodiment is common to that in FIG. 1.

Figure 6:
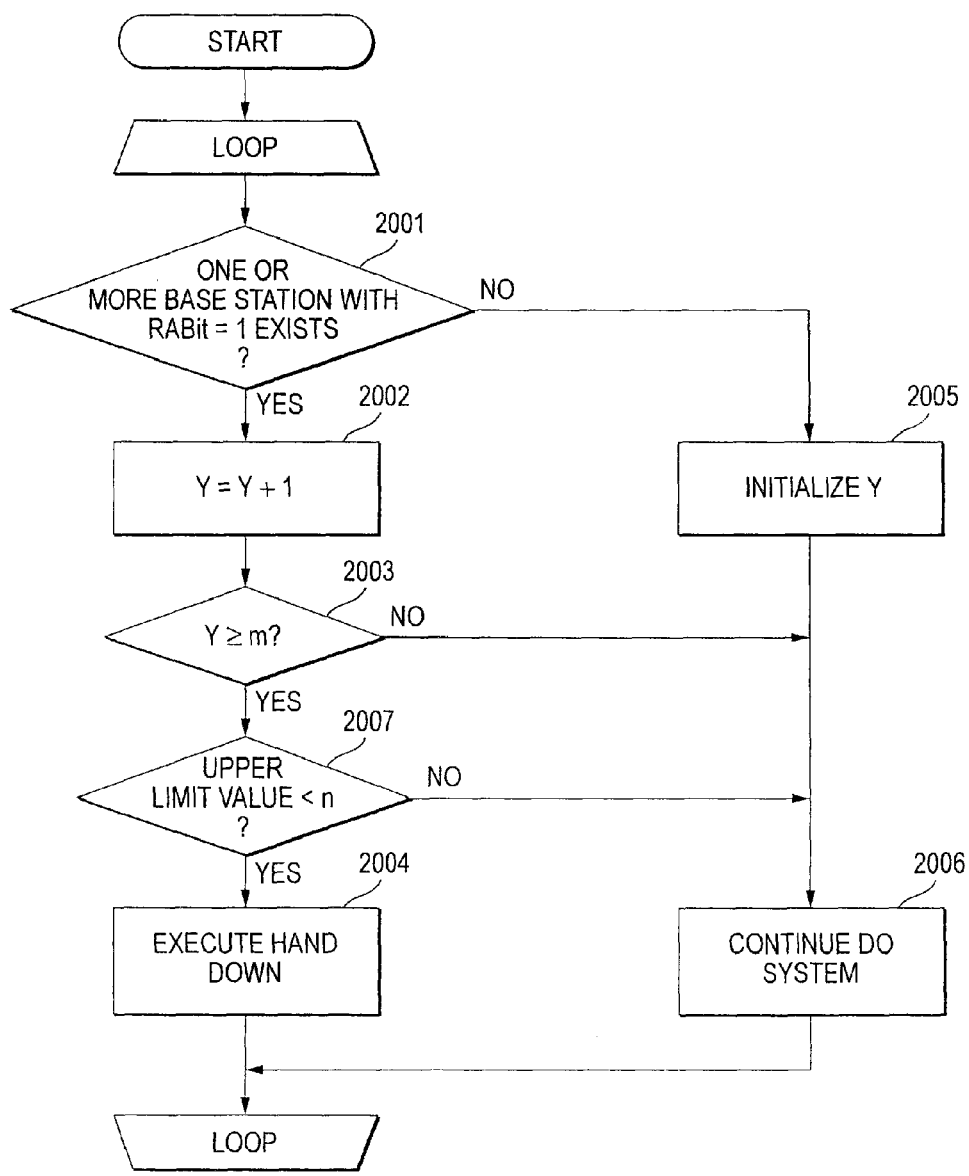
FIG. 6 is a flowchart to show hand down process in a second embodiment of the invention.

FIG. 6 is a flowchart to show the hand down process executed by a system control section 50 of a wireless communication terminal 200 of the second embodiment of the invention. Steps 2001 to 2006 are similar to those of the first embodiment shown in FIG. 4 and therefore are denoted by the same step numbers in FIG. 6 and will not be discussed again.

If it is determined at step 2003 that the RABit with the bit value "1" has been received successively for a predetermined threshold value m or more, the system control section 50 as a comparison section makes a comparison between the upper limit value of the current transmission rate and a predetermined threshold value n to determine whether or not the upper limit value is lower than the threshold value n (step 2007).

If it is determined as a result of the comparison that the upper limit value of the current transmission rate is lower than the threshold value n, the process goes to step 2004 and the system control section 50 as a control section sends a command to an RF control section 40 for switching the RF control section 40 as a switching section to execute hand down from a DO system to a 1x system for starting communication in the 1x system (step 2004).

On the other hand, if it is determined as a result of the comparison at step 2007 that the upper limit value of the current transmission rate is equal to or greater than the threshold value n, the communication in the DO system is continued without executing hand down (step 2006).

The threshold value n is preset to the transmission rate at which it is assumed that communication can be performed at high speed if the DO system is switched to the 1x system for performing communication. For example, the upper limit value of the up transmission rate in the 1x system (76.8 kbps) may be adopted as the value of n.

As described above, the wireless communication terminal 200 of the second embodiment of the invention executes hand down only if the upper limit value of the actual transmission rate becomes lower than the predetermined threshold value n as a result of receiving the RABit set to "1" successively for the predetermined number of times (threshold value m) or more during the communication in the DO system.

In so doing, the following advantages are provided: If the RABit is set to "1," the random number x is generated and if the random number x is equal to or greater than the threshold value α as a result of making a comparison between the random number x and the threshold value α, the upper limit value of the transmission rate is maintained as described above in the first embodiment. Thus, even if the RABit indicating "1" is received for the predetermined number of times Y or more, if the acquired random number x exceeds the threshold value α, the upper limit value of the transmission rate is not lowered. Thus, if the RABit indicating "1" is received, when the upper limit value of the actual transmission rate is not lowered, communication can be performed at higher speed if the communication are continued in the DO system.

In the second embodiment, a comparison is made between the upper limit value of the actual transmission rate and the predetermined threshold value n and only if the actual transmission rate lowers, hand down is executed, and if the upper limit value of the DO system transmission rate is sufficiently high, the communication is continued in the DO system without performing the hand down to the 1x system. Consequently, the throughput of the uplink communication can be enhanced.

Next, a third embodiment of the invention will be discussed.

In the third embodiment, hand down process when RABit is transmitted from a base station 100A as in the first embodiment will be discussed. A wireless communication system of the third embodiment is common to that in FIG. 1.

Figure 7:
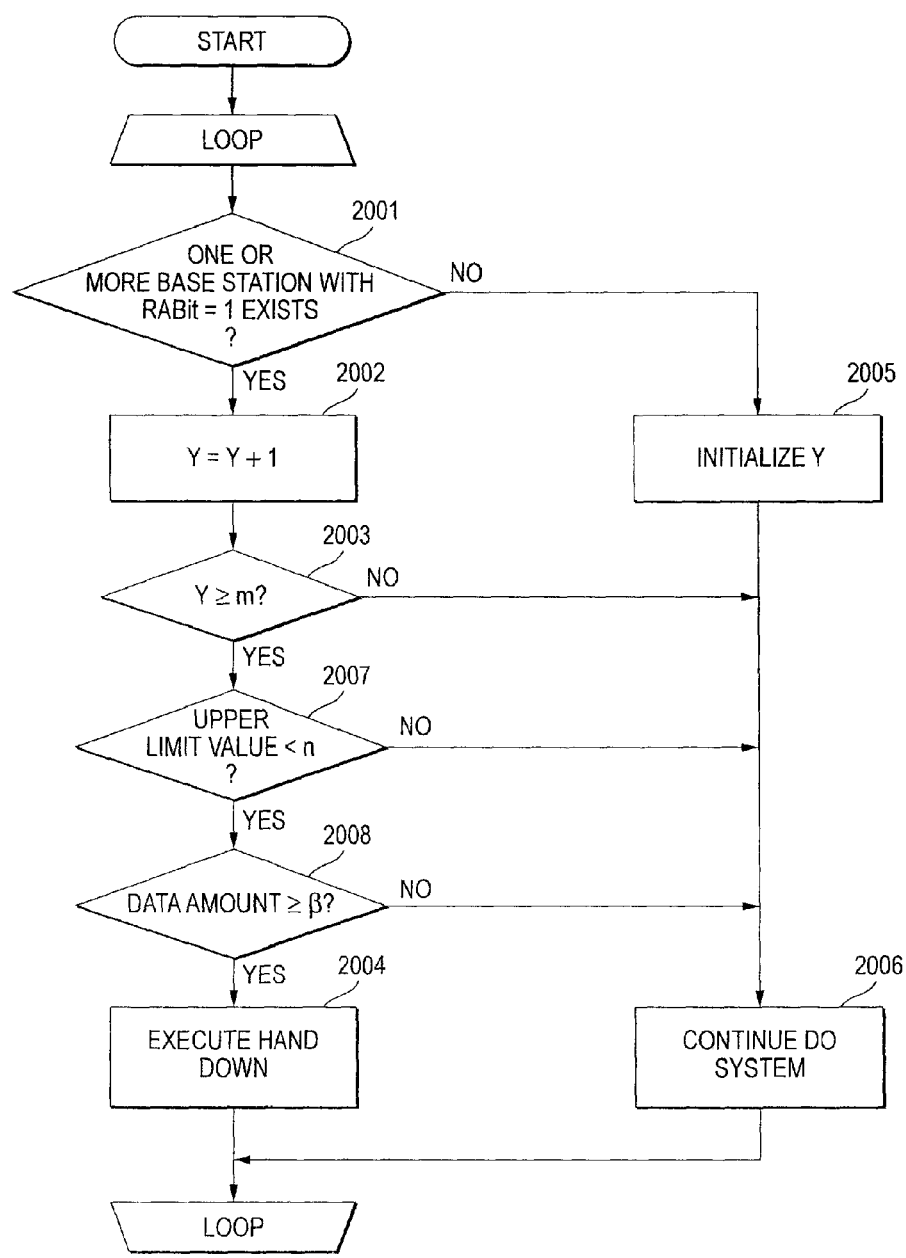
FIG. 7 is a flowchart to show hand down process in a third embodiment of the invention.

FIG. 7 is a flowchart to show the hand down process executed by a system control section 50 of a wireless communication terminal 200 of the third embodiment of the invention. Steps 2001 to 2007 are similar to those of the first and second embodiments shown in FIGS. 4 and 6 and therefore are denoted by the same step numbers in FIG. 7 and will not be discussed again.

If it is determined as a result of the comparison at step 2007 that the upper limit value of the current transmission, rate is lower than a threshold value n, then the system control section 50 as a derivation section derives the data amount of data targeted for uplink communication by referencing a buffer in a system storage section 60, for example.

Whether or not the derived data amount is equal to or greater than a predetermined threshold value β is determined (step 2008).

If the derived data amount is equal to or greater than the threshold value β as a result of the determination, the system control section 50 as a control section sends a command to an RF control section 40 for switching the RF control section 40 as a switching section to execute hand down from a DO system to a 1x system for starting communication in the 1x system (step 2004).

On the other hand, if it is determined as a result of the determination at step 2008 that the derived data amount is less than the threshold value β, the communication in the DO system is continued without executing hand down (step 2006).

The predetermined threshold value β is preset to the data amount in which it is assumed that communication can be performed efficiently if the hand down from the DO system to the 1x system is performed because the DO system is congested.

In this case, a comparison may be made between the whole amount of the data to be transmitted and the threshold value β for determination, or a comparison may be made between the non-transmitted data amount resulting from subtracting the already transmitted data amount from the whole amount of the data to be transmitted and the threshold value β for determination.

As described above, the wireless communication terminal 200 of the third embodiment of the invention executes hand down from the DO system to the 1x system only if it is determined that the amount of data equal to or greater than the predetermined threshold value β is to be transmitted, when the upper limit value of the actual transmission rate becomes lower than the predetermined threshold value n as a result of receiving the RABit set to "1" successively for the predetermined number of times (threshold value m) or more during the communication in the DO system.

In so doing, the following advantages are provided:

The hand down process from the DO system to the 1x system requires a some amount of processing time. If the upper limit value of the DO system transmission rate is somewhat low, to transmit a small amount of data whose transmission will become complete in a short time, it requires time for the hand down process time if the hand down from the DO system to the 1x system is performed; the total time until completion of transmission of all data may become longer than the time taken when the hand down from the DO system to the 1x system is not performed.

In the embodiment, if the data amount is small to such an extent that the hand down should be skipped, the communication is continued in the DO system without performing the hand down to the 1x system. Consequently, the throughput of the uplink communication can be enhanced.

Next, a fourth embodiment of the invention will be discussed.

In the fourth embodiment, hand down process when CurrentRateLimit is transmitted from a base station 100A will be discussed. A wireless communication system of the fourth embodiment is common to that in FIG. 1.

Figure 8:
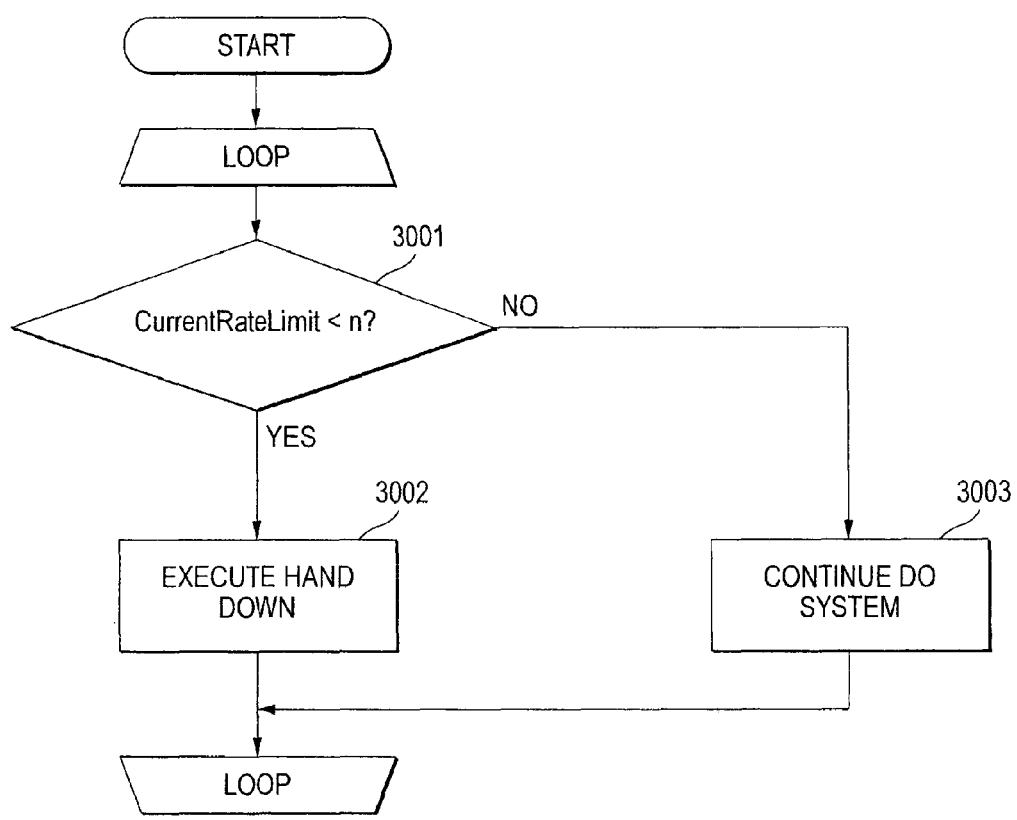
FIG. 8 is a flowchart to show hand down process in a fourth embodiment of the invention.

FIG. 8 is a flowchart to show the hand down process executed by a system control section 50 of a wireless communication terminal 200 of the fourth embodiment of the invention.

While the wireless communication terminal 200 is performing uplink communication in a DO system, when a DO RF section 30 as a reception section receives CurrentRateLimit through an antenna 10, a system control section 50 as a comparison section makes a comparison between the upper limit value of transmission rate indicated by CurrentRateLimit and a predetermined threshold value n (step 3001).

If it is determined as a result of the comparison that the upper limit value of transmission rate indicated by CurrentRateLimit is lower than the predetermined threshold value n, the system control section 50 as a control section sends a command to an RF control section 40 for switching the RF control section 40 as a switching section to execute hand down from the DO system to a 1x system for starting communication in the 1x system (step 3002).

On the other hand, if it is determined as a result of the determination at step 3002 that the upper limit value of transmission rate indicated by CurrentRateLimit is higher than the predetermined threshold value n, the communication in the DO system is continued without executing hand down (step 3003).

The threshold value n to be compared with the transmission rate indicated by CurrentRateLimit is preset to the transmission rate such that it is assumed that communication can be performed at higher speed if the DO system is switched to the 1x system for performing communication.

For example, the upper limit value of the up transmission rate in the 1x system (76.8 kbps) may be adopted as the value of n.

Figure 9:
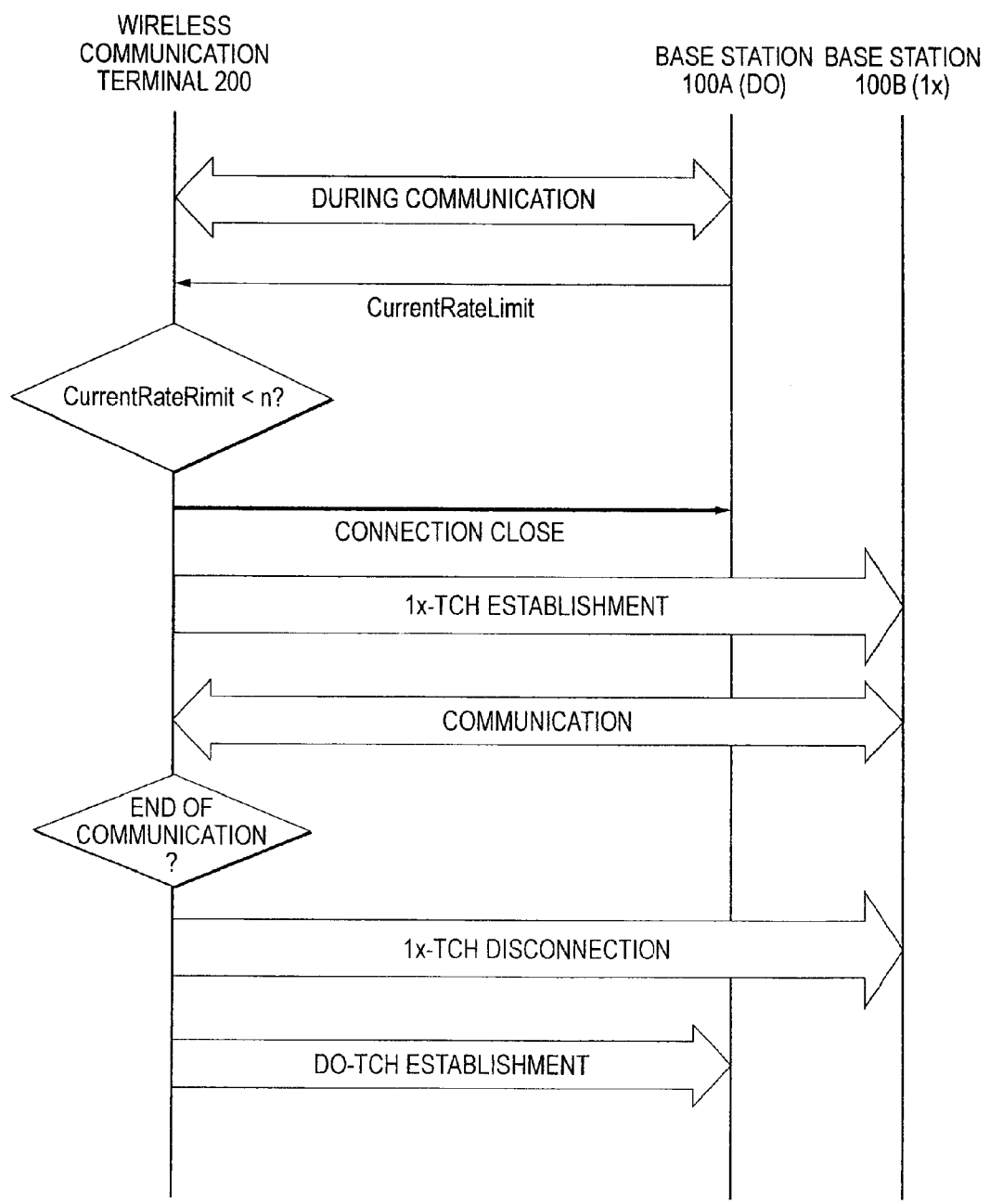
FIG. 9 is a sequence chart to show the hand down process in the fourth embodiment of the invention.

FIG. 9 is a sequence chart to show the hand down process executed by the system control section 50 of the wireless communication terminal 200 of the fourth embodiment of the invention.

While the wireless communication terminal 200 is performing uplink communication in the DO system, when the base station 100A transmits CurrentRateLimit and the DO RF section 30 as a reception section receives CurrentRateLimit through the antenna 10, the system control section 50 makes a comparison between the upper limit value of transmission rate indicated by CurrentRateLimit and the predetermined threshold value n. If it is determined as a result of the comparison that the upper limit value of transmission rate indicated by CurrentRateLimit is lower than the predetermined threshold value n, the wireless communication terminal 200 transmits a "ConnectionClose message" to the base station 100A for disconnecting the communication in the DO system. Then, the wireless communication terminal 200 establishes 1x-TCH (1x system traffic channel) with a 1x system base station 100B.

After this, upon completion of the uplink communication using the 1x system, preferably 1x-TCH is disconnected and DO-TCH (DO system traffic channel) is established with the base station 100A for restoring to the communication-possible state in the DO system.

As described above, when the wireless communication terminal 200 of the fourth embodiment of the invention receives CurrentRateLimit indicating the transmission rate lower than the predetermined transmission rate (threshold value n) during the communication in the DO system, the hand down from the DO system to the 1x system is performed.

In so doing, if the base station 100A is heavily congested and communication cannot be performed at satisfactory transmission rate, the DO system is abandoned and switching to the 1x system is made in which higher transmission rate can be expected for performing communication.

Consequently, the throughput of the uplink communication can be enhanced.

Next, a fifth embodiment of the invention will be discussed.

In the fifth embodiment, hand down process when CurrentRateLimit is transmitted from a base station 100A as in the fourth embodiment will be discussed. A wireless communication system of the fifth embodiment is common to that in FIG. 1.

Figure 10:
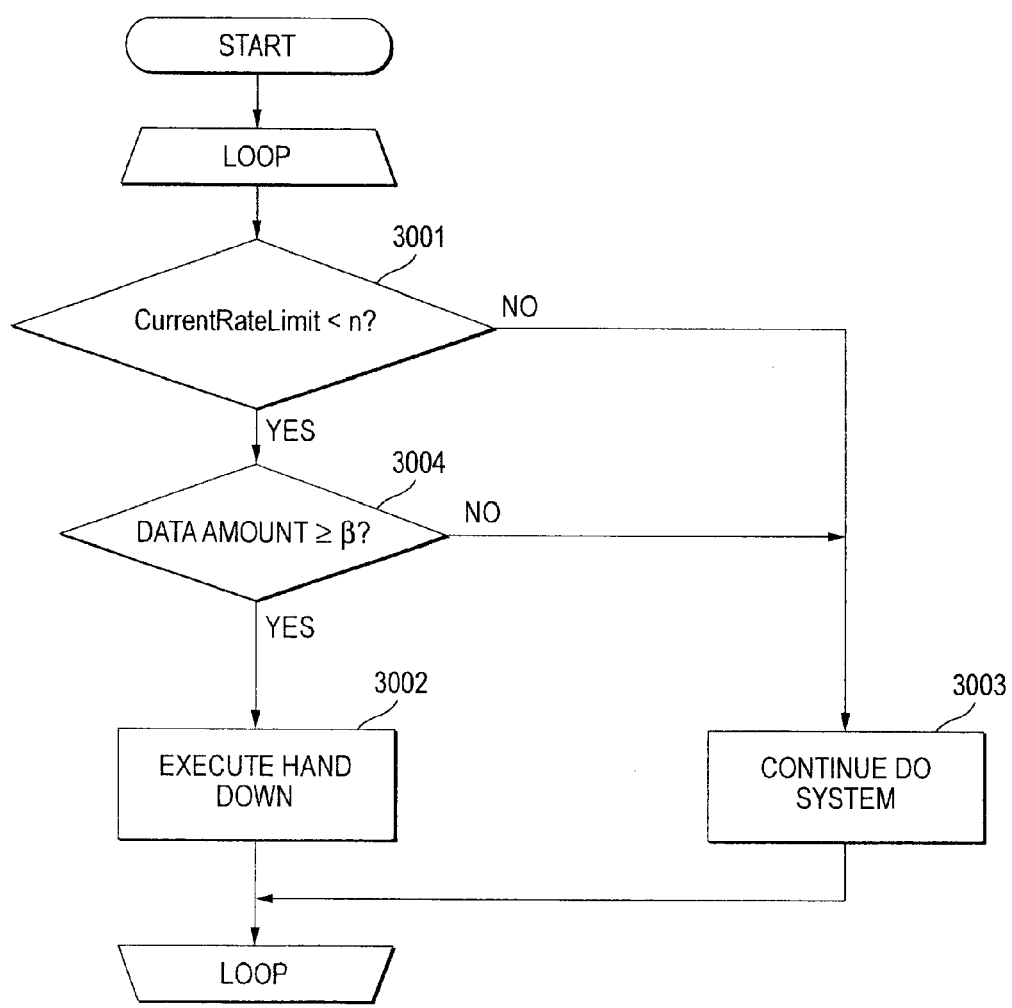
FIG. 10 is a flowchart to show hand down process in a fifth embodiment of the invention.

FIG. 10 is a flowchart to show the hand down process executed by a system control section 50 of a wireless communication terminal 200 of the fifth embodiment of the invention. Steps 3001 to 3003 are similar to those of the fourth embodiment shown in FIG. 8 and therefore are denoted by the same step numbers in FIG. 10 and will not be discussed again.

If it is determined as a result of the comparison at step 3001 that the upper limit value of transmission rate indicated by CurrentRateLimit is lower than a predetermined threshold value n, then a system control section 50 as a derivation section derives the data amount of data targeted for uplink communication by referencing a buffer in a system storage section 60, for example.

Whether or not the derived data amount is equal to or greater than a predetermined threshold value β is determined (step 3004). If the derived data amount is equal to or greater than the threshold value β as a result of the determination, the system control section 50 as a control section sends a command to an RF control section 40 for switching the RF control section 40 as a switching section to execute hand down from a DO system to a 1x system for starting communication in the 1x system (step 3002).

On the other hand, if it is determined as a result of the determination at step 3004 that the derived data amount is less than the threshold value β, the communication in the DO system is continued without executing hand down (step 3003).

The predetermined threshold value β is preset to the data amount in which it is assumed that communication can be performed efficiently if the hand down from the DO system to the 1x system is performed because the DO system is congested.

In this case, a comparison may be made between the whole amount of the data to be transmitted and the threshold value β for determination, or a comparison may be made between the non-transmitted data amount resulting from subtracting the already transmitted data amount from the whole amount of the data to be transmitted and the threshold value β for determination.

As described above, the wireless communication terminal 200 of the fifth embodiment of the invention executes hand down from the DO system to the 1x system only if it is determined that the amount of data equal to or greater than the predetermined threshold value β is to be transmitted upon reception of CurrentRateLimit indicating the transmission rate lower than the predetermined transmission rate (threshold value n) during the communication in the DO system.

In so doing, the following advantages are provided:

The hand down process from the DO system to the 1x system requires a some amount of processing time. Even if the upper limit value of the DO system transmission rate is somewhat low, to transmit a small amount of data whose transmission will become complete in a short time, it requires time for hand down process if the hand down is performed from the DO system to the 1x system; the total time until completion of transmission of all data may become longer than the time taken when the DO system is not handed down to the 1x system.

In the present embodiment, if the data amount is small to such an extent that the hand down should be skipped, the communication is continued in the DO system without handing down to the 1x system. Consequently, the throughput of the uplink communication can be enhanced.

In the fourth and fifth embodiments, a case where CurrentRateLimit is received during the communication in the DO system has been described, but the invention can also be applied to a case where CurrentRateLimit is received when communication in the DO system is started.

In any of the first to fifth embodiments described above, if the up transmission rate in the DO system is low and satisfactory throughput cannot be provided, the DO system is switched to the 1x system in which it can be expected that faster communication will be performed, for performing communication, so that the throughput of the wireless communication terminal 200 can be enhanced.

Aspects of the first through fifth embodiments may be combined.

That is, upon reception of RABit, the wireless communication terminal 200 may perform the processing of the first embodiment in FIG. 4; upon reception of CurrentRateLimit, the wireless communication terminal 200 may perform the processing of the fourth embodiment in FIG. 8.

In the embodiments of the invention, the pilot signal strength (RSSI value) is used to determine the radio wave state with the base station, but the carrier to interference wave ratio (C/I value) of pilot signal may be used in place of the pilot signal strength (RSSI value).

In the embodiments of the invention, the hybrid system of the CDMA2000 1x system and the CDMA2000 1xEVDO system has been described, but the invention is not limited to it. Any type of communication system may be adopted if communication can be performed in two or more communication systems and the communication systems are switched in such a manner that data communication are performed in one communication system and the communication system is switched to the other communication system for performing data communication.

Figure 11:
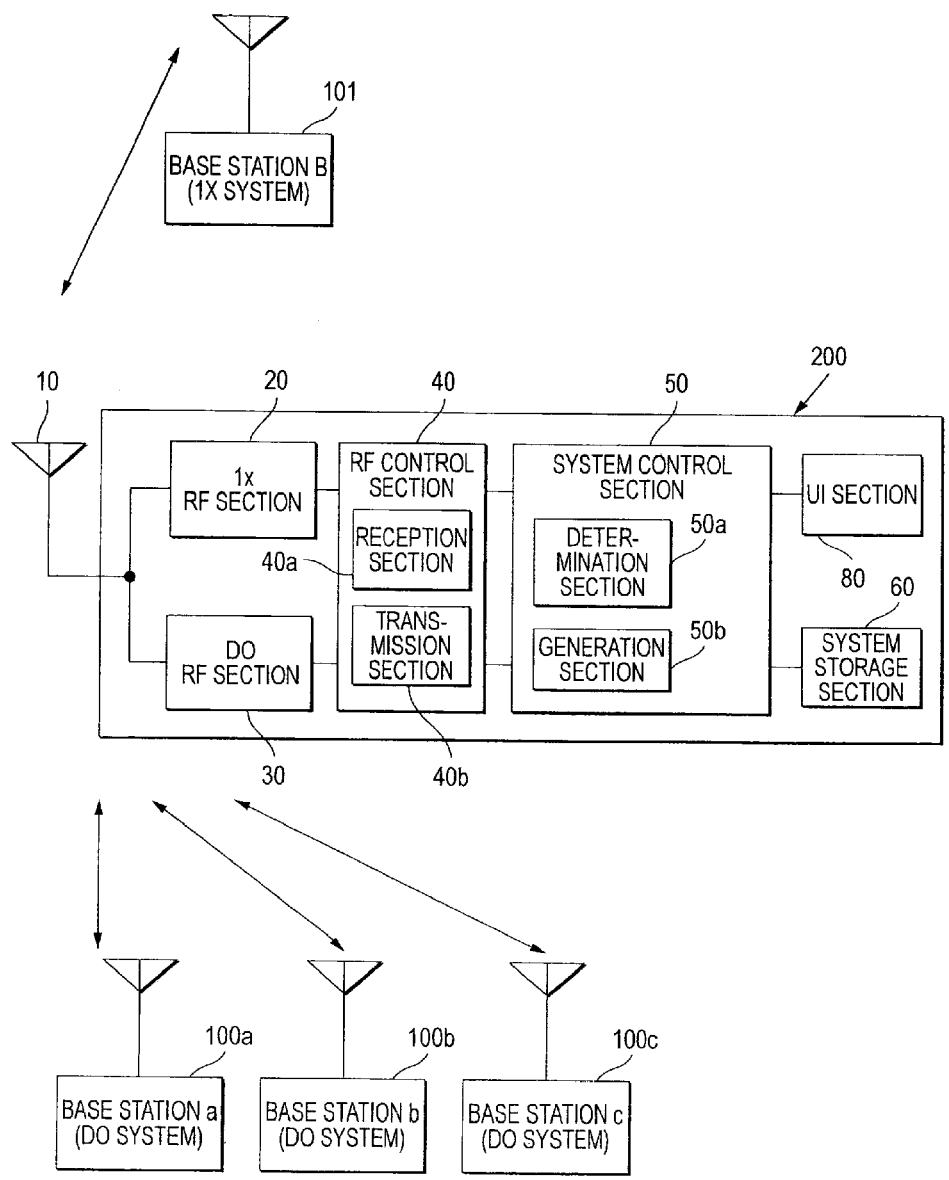
FIG. 11 is a block diagram showing a configuration of a wireless communication terminal of a sixth embodiment of the invention.

A sixth embodiment of the invention will be discussed below with reference to the accompanying drawings:

FIG. 11 is a block diagram showing a configuration of a wireless communication terminal 200 of the sixth embodiment of the invention.

The wireless communication terminal (mobile telephone terminal) 200 of the embodiment is a wireless communication terminal capable of switching between a CDMA2000 1x communication system (which will be hereinafter referred to as "1x system") and a 1xEVDO communication system (which will be hereinafter referred to as "DO system") to perform data communication with a DO system base station 100 (100a, 100b, 100c) or a 1x system base station 101, by using a common antenna 10.

The base stations 100a, 100b, and 100c perform DO system communication with the wireless communication terminal 200 and the base station 101 performs 1x system-communication with the wireless communication terminal 200.

The base station to which the wireless communication terminal 200 connects for performing communication will be hereinafter referred to as "connecting base station" and one or more base stations adjacent to the connecting base station which are candidates of handoff destination will be hereinafter referred to as "peripheral base stations."

The antenna 10 converts a radio-frequency signal from either a 1xRF section 20 or a DO RF section 30 into a radio wave and transmits the radio wave to the base station 100, 101 and receives a radio wave from the base station 100, 101 and sends the radio wave to the 1xRF section 20 or the DO RF section 30 as a radio-frequency signal.

The 1xRF section 20 converts data or a voice signal transmitted in the 1x system into a radio-frequency signal and sends the radio-frequency signal to the antenna 10. It also converts a radio-frequency signal sent from the antenna 10 into a data signal or a voice signal.

The DO RF section 30 converts data transmitted in the DO system into a radio-frequency signal and sends the radio-frequency signal to the antenna 10.

It also converts a radio-frequency signal sent from the antenna 10 into a data signal.

The DO RF section 30 serves as a reception section and a transmission section.

An RF control section 40 is a control section for controlling communication of the two systems of the DO system and the 1x system.

The RF control section 40 measures the strength of a radio wave from the base station 100 received at the antenna 10 (RSSI, etc.,).

A system control section 50 is a control section for performing centralized control of the sections of the wireless communication terminal 200.

The system control section 50 controls the RF control section 40 to control switching between the two systems of the DO system and the 1x system. The system control section 50 serves as a generation section and a determination section.

A system storage section 60 is implemented as a memory such as RAM and stores an application, temporary data, etc.

Figure 12A:
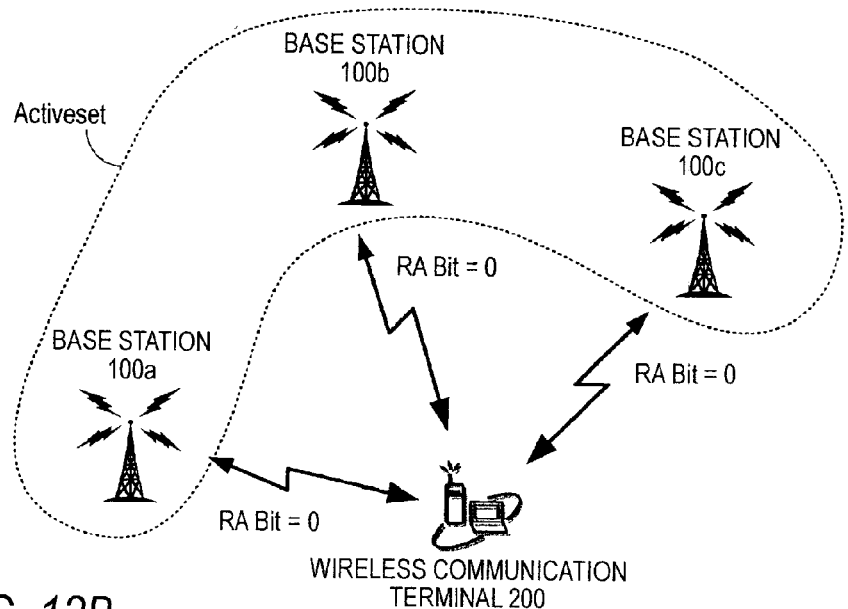
FIGS. 12(*a*) and (*b*) are schematic representations for Activeset and RABit in a sixth embodiment of the invention.
Figure 12B:
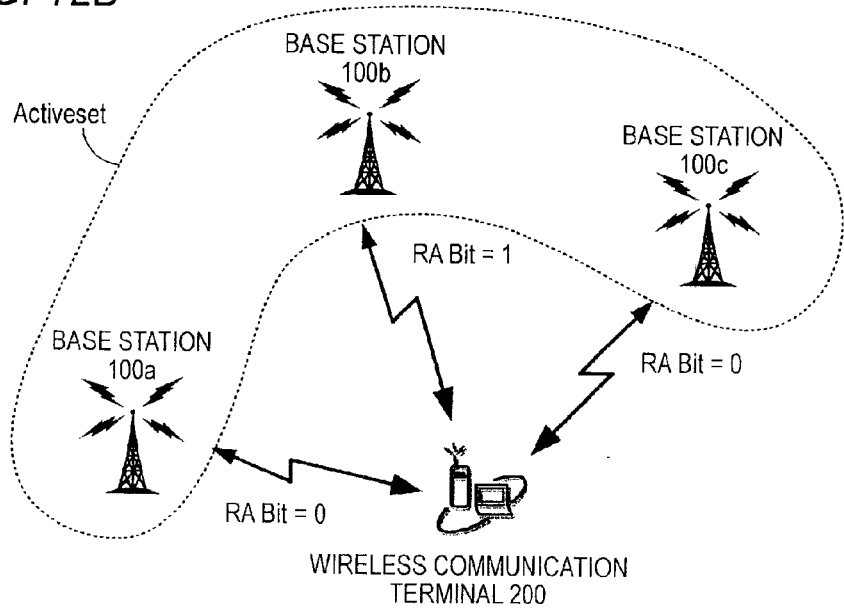

Next, the operation of the wireless communication terminal 200 of the sixth embodiment of the invention is as follows:

First, variation of the upper limit value of transmission rate in data communication in the DO system of the sixth embodiment of the invention will be discussed with reference to FIGS. 2, 3 and 12($a$) and ($b$).

First, in uplink communication in the DO system, the upper limit value of transmission rate is classified into five steps of 9.6 kbps, 19.2 kbps, 38.4 kbps, 76.8 kbps, and 153.6 kbps.

When the wireless communication terminal 200 starts uplink communication with the base station 100a, first the wireless communication terminal starts communication at the lowest transmission rate (9.6 kbps) and then changes the upper limit value of transmission rate according to the congestion degree of the base station 100a of the connecting base station and the congestion degree of the base stations 100b and 100c which are the peripheral base stations of the base station 100a and candidates of handoff destination.

Specifically, the connecting base station 100a has information indicating the peripheral base stations 100b and 100c as candidates of handoff destination, as "Activeset." Each of the connecting base station 100a and the peripheral base stations 100b and 100c registered in Activeset transmits RABit (Reverse Activity Bit), which is the instruction information to increase or decrease the upper limit value of the transmission rate according to the congestion degree of each base station. The wireless communication terminal 200 receives the RABit and adjusts the transmission rate. (Please refer to FIGS. 12($a$) and ($b$).

The "RABit" is a bit value that varies depending on the congestion state of the base station.

Congestion of the base station refers to a case where a large number of wireless communication terminals connect to the base station in a concentrated manner, a case where a congestion occurs in the communication line, or the like. If there is no congested base station, namely, if the transmission rate can be increased, the RABit is set to "0."

If one or more congested base stations exist, namely, if it is unpreferable to increase the transmission rate, the RABit is set to "1." The RABit serves as the instruction information indicating the upper limit value of the transmission rate of the wireless communication terminal 200 (vary or lower the upper limit value).

FIG. 3 is a flowchart of transmission rate change executed by the system control section 50 of the wireless communication terminal 200.

When the wireless communication terminal 200 starts uplink communication in the DO system, first the wireless communication terminal starts communication at the lowest transmission rate (9.6 kbps).

Then, when the antenna 10 receives RABits from the base station 100a and the peripheral base stations 100b and 100c registered in Activeset, whether or not the RABits include RABit set to "1" is determined (step 1001).

If it is determined that all RABits are "0," the operation is performed so as to increase the upper limit value of the current transmission rate one step.

In this case, the transmission rate is increased probabilistically rather than absolutely.

That is, first, a random number x (which is in the range of 0<x<1) is generated (step 1002).

Whether or not the generated random number x is smaller than a threshold value $\alpha$ to change the transmission rate is determined (step 1003). Here, the threshold value $\alpha$ varies depending on the current transmission rate as shown in FIG.

2. For example, when an attempt is made to increase the transmission rate one step from 9.6 kbps to 19.2 kbps, the threshold value α becomes the value resulting from dividing "0x30" (hexadecimal notation), namely, "48" by 255, namely, 48/255.

In the example, at step 1003, whether or not the random number x is larger than or smaller than 48/255 is determined.

If it is determined at step 1003 that the random number x is smaller than the threshold value α, the upper limit value of the current transmission rate is increased one step (step 1004).

For example, if the current transmission rate is 9.6 kbps, it is changed to 19.2 kbps, one step up. On the other hand, if it is determined that the random number x is equal to or larger than the threshold value α, the upper limit value of the current transmission rate is maintained (step 1005). For example, if the current transmission rate is 9.6 kbps, it remains in 9.6 kbps.

On the other hand, if it is determined at step 1001 that the base station, even one base station, with the RABit set to "1" exists, the operation is performed so as to lower the upper limit value of the current transmission rate one step.

That is, first, a random number x (which is in the range of 0<x<1) is generated (step 1006) and a comparison is made between the random number x and the threshold value α (step 1007).

If it is determined that the random number x is smaller than the threshold value α, the upper limit value of the current transmission rate is decreased one step (step 1008).

For example, if the current transmission rate is 19.2 kbps, it is changed to 9.6 kbps, one step down. On the other hand, if it is determined that the random number x is equal to or larger than the threshold value α, the upper limit value of the current transmission rate is maintained (step 1005).

For example, if the current transmission rate is 19.2 kbps, it remains in 19.2 kbps.

Thus, the wireless communication terminal 200 can vary the upper limit value of the transmission rate probabilistically and stepwise based on the RABit transmitted at every predetermined timing from each of the connecting base station 100*a* and the peripheral base stations 100*b* and 100*c* registered in Activeset.

On the other hand, if one of the peripheral base stations registered in Activeset is congested, the wireless communication terminal 200 operates so as to lower the upper limit value of the transmission rate. Thus, for example, if hand off is made from the base station 100*a* performing communication at high speed to the base station 100*b* which is congested and can perform communication only at low speed, occurrence of a communication error such as packet loss caused by a rapid lower in the transmission rate can be prevented.

The Activeset that the base station 100*a* has is updated based on the communication quality between the wireless communication terminal 200 and the base station 100.

Figure 13A:
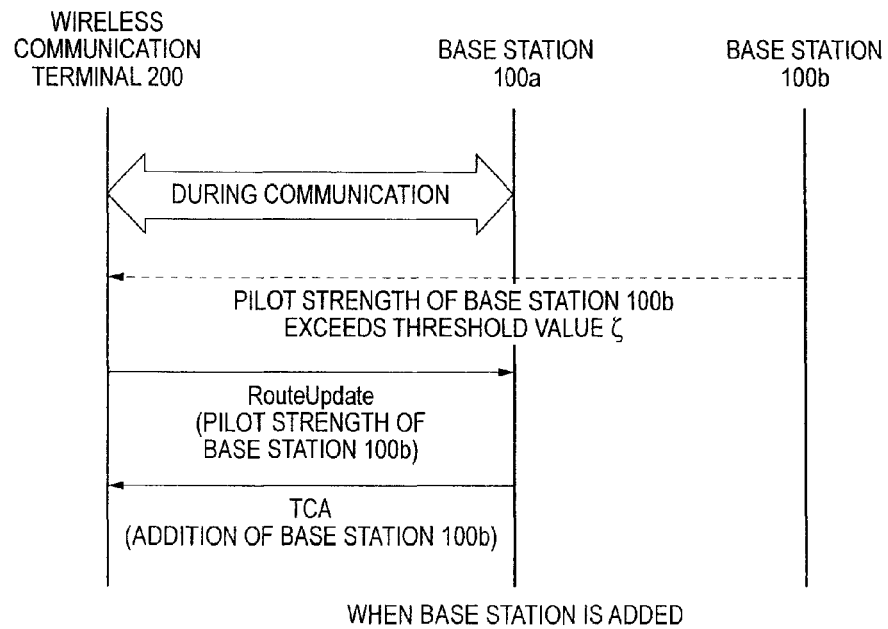
FIGS. 13(*a*) and (*b*) are schematic representations to show addition and deletion of the base station on time base in a sixth embodiment of the invention.
Figure 13B:
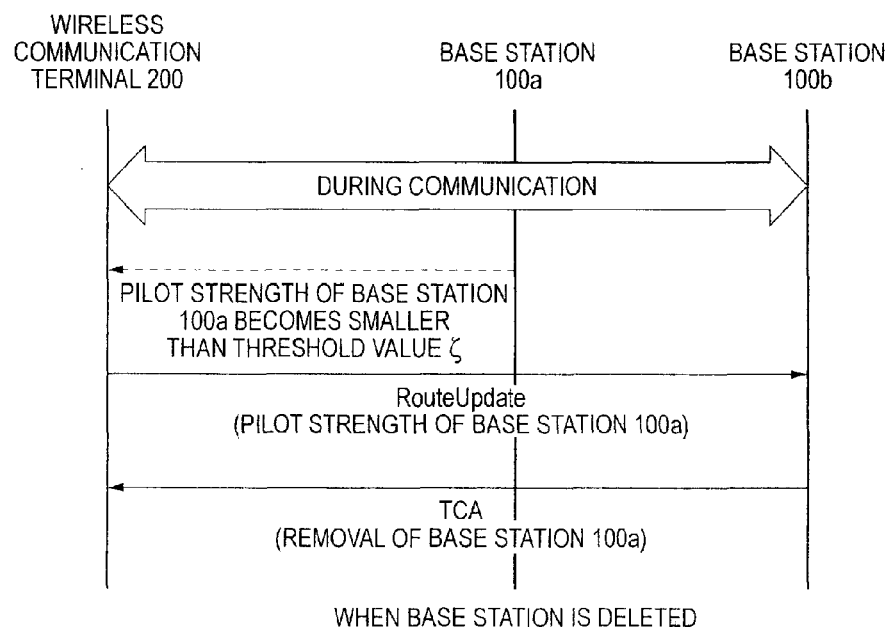

FIG. 13 is a sequence chart to show update processing of Activeset in the embodiment; FIG. 13 (*a*) shows addition of a base station to Activeset and FIG. 13 (*b*) shows removal of a base station from Activeset.

In FIG. 13 (*a*), the wireless communication terminal 200 performs communication with the base station 100*a* as the connecting base station.

At this time, it is assumed that the peripheral base station 100*b* is not registered in Activeset. Here, the wireless communication terminal 200 measures the signal strength of a pilot signal of the peripheral base station 100*b* (RSSI value) and transmits a "RouteUpdate message" including the measurement value to the connecting base station 100*a*.

Upon reception of the RouteUpdate message, the connecting base station 100*a* registers the peripheral base station 100*b* in Activeset and transmits a "TCA (Traffic Channel Assignment) message" to the effect that the peripheral base station 100*b* is registered in Activeset, to the wireless communication terminal 200, if the measurement value is equal to or greater than a predetermined threshold value ζ (ζ is a threshold value for registering a base station in Activeset).

The wireless communication terminal 200 obtains information of the peripheral base station 100*b* added to Activeset according to the TCA message.

On the other hand, in FIG. 13 (*b*), the wireless communication terminal 200 performs communication with the base station 100*b* as the connecting base station.

At this time, it is assumed that the peripheral base station 100*a* is registered in Activeset.

Here, the wireless communication terminal 200 measures the signal strength of a pilot signal of the peripheral base station 100*a* and transmits a RouteUpdate message including the measurement value to the connecting base station 100*b*.

Upon reception of the RouteUpdate message, the connecting base station 100*b* removes the peripheral base station 100*a* from Activeset and transmits a TCA message to the effect that the peripheral base station 100*a* is removed from Activeset, to the wireless communication terminal 200, if the measurement value is less than the predetermined threshold value ζ (ζ is a threshold value for registering a base station in Activeset).

The wireless communication terminal 200 obtains information of the peripheral base station 100*a* removed from Activeset according to the TCA message.

As described above, the base station is registered in/removed from Activeset, whereby the peripheral base station 100 with good communication quality between the wireless communication terminal 200 and the base station 100 (the signal strength of the pilot signal being equal to or greater than the threshold value ζ) is aggressively set to a candidate of the handoff destination, so that communication with good communication quality can always be performed.

On the other hand, the peripheral base station 100 with poor communication quality between the wireless communication terminal 200 and the base station 100 (the signal strength of the pilot signal being less than the threshold value ζ) is removed from the candidates of the handoff destination. Thus, unnecessary hand down to a base station can be prevented, which has poor communication quality and may be immediately disconnected upon connection.

If a base station, even one, that is congested exists among the base stations registered in Activeset and the base station indicates RABit="1," the upper limit value of the transmission rate is not increased in accordance with the processing in FIG. 3 even if the connecting base station and other peripheral base stations are not congested and indicate RABit="0."

Figure 14:
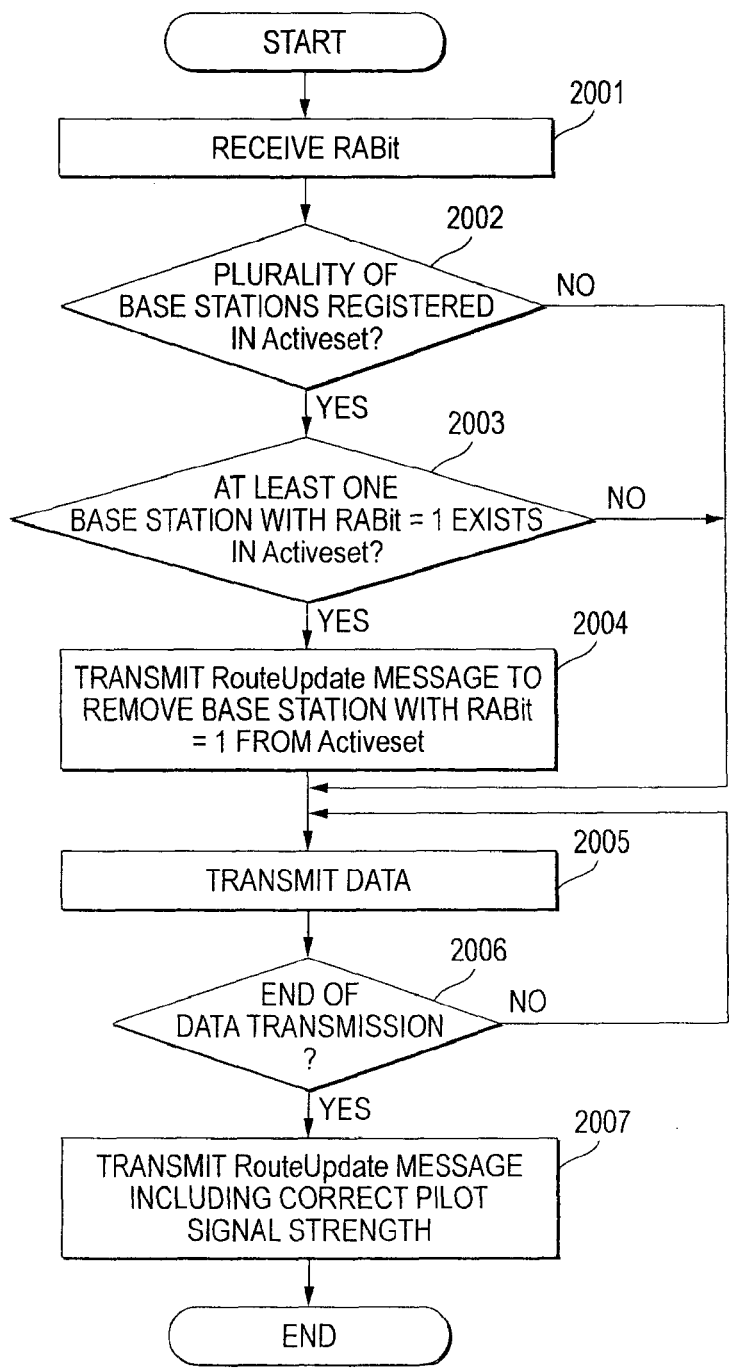
FIG. 14 is a flowchart at an uplink data transmission time in a sixth embodiment of the invention.

Then, to perform DO system communication, the wireless communication terminal 200 of the embodiment performs the following processing:

FIG. 14 is a flowchart at the uplink data transmission time in the DO system executed by the wireless communication terminal 200.

It is assumed that the connecting base station 100*a* registers the peripheral base stations 100*b* and 100*c* in Activeset.

The wireless communication terminal 200 starts uplink data communication with the base station 100*a* as the connecting base station.

The DO RF section 30 of the wireless communication terminal 200 (reception section) receives RABit that is transmitted at every predetermined timing by each of the peripheral base stations 100b and 100c registered in Activeset during the uplink data communication (step 2001).

Upon reception of RABit, the system control section 50 determines whether or not a plurality of peripheral base stations is registered in Activeset (step 2002). When only one peripheral base station is registered in Activeset, if the base station is removed from Activeset, the base station to perform handoff vanishes and therefore the process goes to step 2005 and data transmission is executed.

If it is determined at step 2002 that a plurality of peripheral base stations is registered in Activeset, the system control section 50 (determination section) determines whether or not the peripheral base stations registered in Activeset include a peripheral base station, even one, which indicates RABit="1," namely, that is congested and is hard to increase the transmission rate (step 2003).

As a result of the determination, if the peripheral base station indicating RABit="1" is not registered in Activeset, namely, if all peripheral base stations indicate RABit="0" and it is possible to increase the transmission rate, the process goes to step 2005 and data transmission is executed.

If it is determined at step 2003 that the peripheral base station indicating RABit="1" exists, evee one, in Activeset, for example, if the peripheral base station 100b of the peripheral base stations is congested and indicates RABit="1," the system control section 50 (generation section) generates a RouteUpdate message to remove the peripheral base station 100b from Activeset and transmits the message from the DO RF section 30 (transmission section) through the antenna section 10 to the connecting base station 100a (step 2004).

The RouteUpdate message to remove the peripheral base station 100b from Activeset includes a value indicating "false pilot signal strength" meaning that the signal strength of the pilot signal of the peripheral base station 100b is less than the threshold value $\zeta$, without transmitting the signal strength of the actual pilot signal of the peripheral base station 100b.

The threshold value $\zeta$ is the threshold value of the signal strength for the base station 100a to register another base station in Activeset as previously described with reference to FIG. 13.

Upon reception of the RouteUpdate message including the "false pilot signal strength," the base station 100a determines that the pilot signal strength is less than the threshold value $\zeta$ and performs processing of removing the peripheral base station 100b indicating the pilot signal strength, from Activeset. The result is sent to the wireless communication terminal 200.

The wireless communication terminal 200 executes data transmission (step 2005).

During the data transmission, transmission rate change process is performed at the predetermined timing for changing the upper limit of the transmission rate probabilistically as previously described with reference to FIG. 3. In this case, since the peripheral base station indicating RABit="1" is removed from Activeset at step 2004, the upper limit of the transmission rate is increased.

The processing is repeated until completion of the data transmission (step 2006).

If it is determined that the data transmission is complete, processing of re-registering in Activeset the base station 100b removed from Activeset for data transmission at step 2004 is performed (step 2007).

That is, a RouteUpdate message including the "correct" pilot signal strength between the peripheral base station 100b and the wireless communication terminal 200 rather than the "false" pilot signal strength generated and transmitted at step 2004 is transmitted. If the "correct" pilot signal strength is equal to or greater than the threshold value $\zeta$, the connecting base station 100a re-registers the peripheral base station 100b in Activeset.

As the processing in FIG. 14 is performed, in data communication, the peripheral base station which is congested and therefore is not allowed to increase the transmission rate (indicating RABit="1") is removed from Activeset of the connecting base station to perform data communication and thus the upper limit value of the up data transmission rate is increased in accordance with the processing in FIG. 3. In so doing, the throughput of the uplink data communication can be enhanced.

Figure 15:
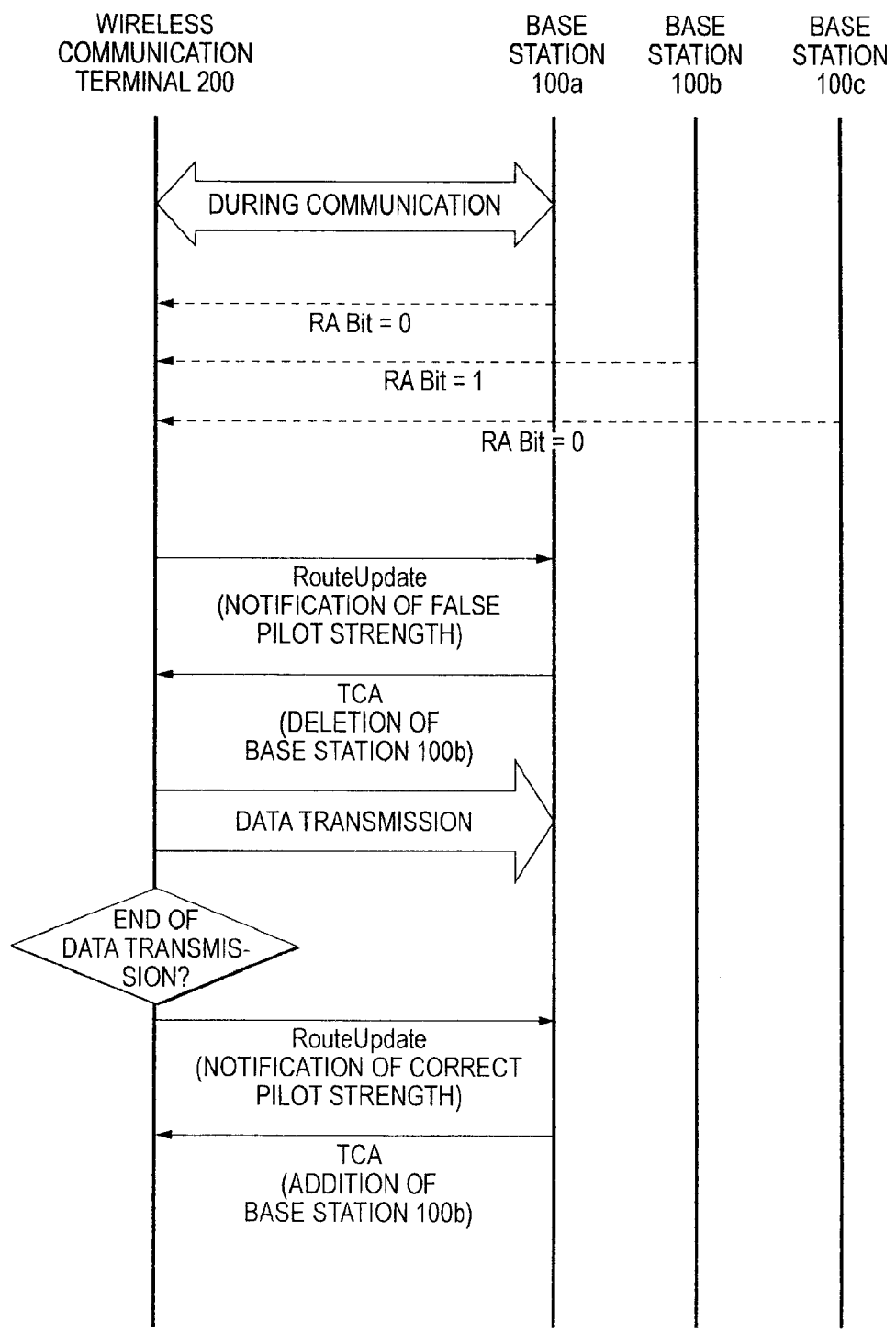
FIG. 15 is a sequence chart at the uplink data transmission time in a sixth embodiment of the invention.

FIG. 15 is a sequence chart at the uplink data transmission time in the DO system executed by the wireless communication terminal 200.

The wireless communication terminal 200 starts communication with the connecting base station 100a.

If the base station 100b of the peripheral base stations registered in Activeset is congested and therefore enters a state in which the transmission rate cannot be increased and indicates RABit="1," a RouteUpdate message including the "false pilot signal strength" is generated and is transmitted to the connecting base station 100a to remove the peripheral base station 100b from Activeset.

Upon reception of the RouteUpdate message including the "false pilot signal strength," the base station 10a determines that the pilot signal strength is less than the threshold value $\zeta$ and performs processing of removing the peripheral base station 100b indicating the pilot signal strength from Activeset. A TCA message is sent to the wireless communication terminal 200 to notify that the base station 100b has been removed from Activeset.

The wireless communication terminal 200 performs data communication in this state, namely, in the state in which the base station not allowed to increase the transmission rate (indicating RABit="1") because of congestion is removed.

If it is determined that the data transmission is complete, a RouteUpdate message including the "correct" pilot signal strength between the peripheral base station 100b and the wireless communication terminal 200 rather than the "false" pilot signal strength is transmitted to re-register the base station 100b removed from Activeset, in Activeset.

If the "correct" pilot signal strength is equal to or greater than the threshold value $\zeta$, the connecting base station 100a re-registers the peripheral base station 100b in Activeset. A TCA message is sent to the wireless communication terminal 200 to notify that the base station 100b has been registered in Activeset.

In the sixth embodiment of the invention described above, in data communication, the peripheral base station not allowed to increase the transmission rate (indicating RABit="1") because of congestion, of the base stations registered in Activeset is removed from Activeset for performing the data communication, and thus the upper limit value of the up data transmission rate is changed probabilistically so that it is increased.

In so doing, the throughput of the up data communication can be enhanced.

Next, a seventh embodiment of the invention will be discussed.

In the seventh embodiment, a base station is removed from Activeset at the data communication time as in the sixth embodiment.

A wireless communication system of the seventh embodiment is common to that of the sixth embodiment in FIG. 11.

Figure 16:
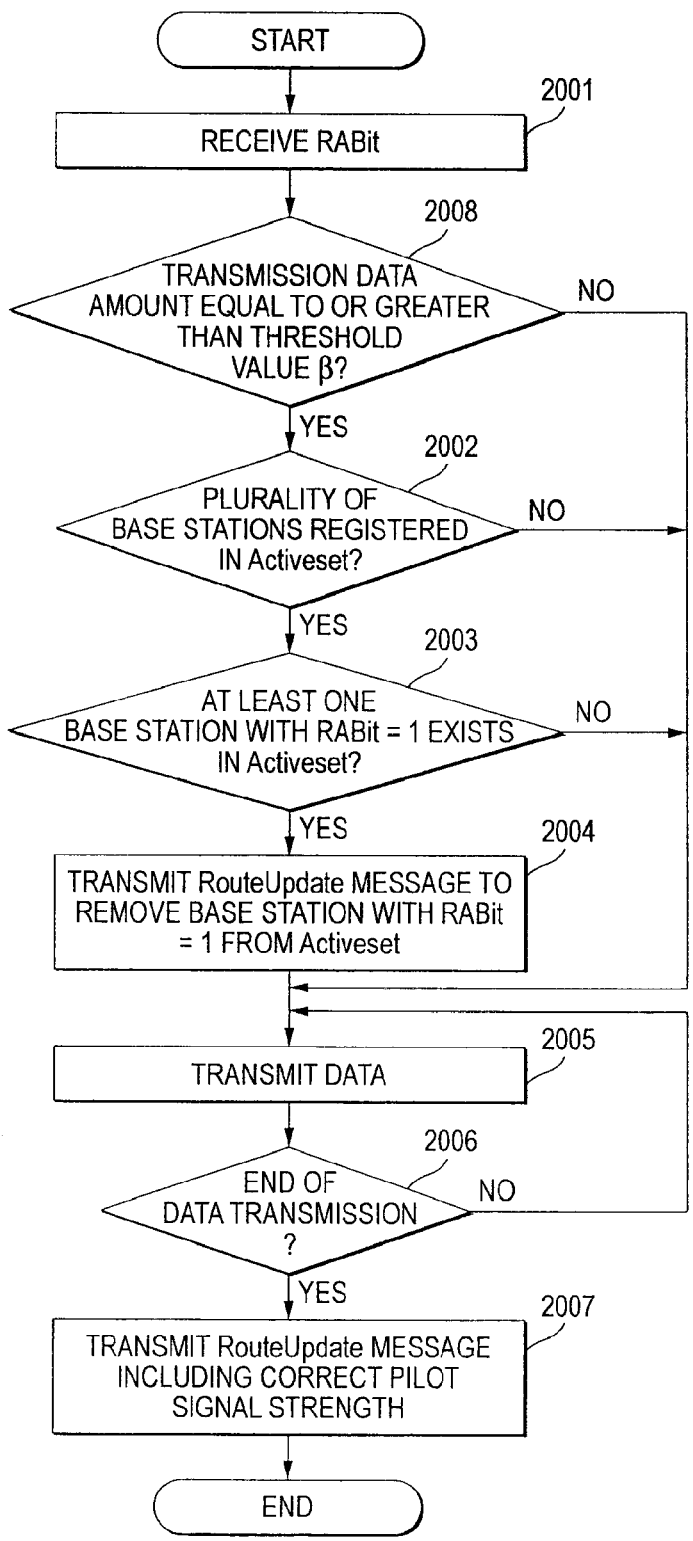
FIG. 16 is a flowchart at an uplink data transmission time in a seventh embodiment of the invention.

FIG. 16 is a flowchart at the up data transmission time in a DO system executed by a wireless communication terminal 200 of the seventh embodiment.

Steps 2001 to 2007 are similar to those of the sixth embodiment shown in FIG. 14 and therefore are denoted by the same step numbers in FIG. 16 and will not be discussed again.

At step 2001, a DO RF section 30 of the wireless communication terminal 200 (reception section) receives RABit transmitted at every predetermined timing by each of peripheral base stations 100b and 100c registered in Activeset during the uplink data communication.

Next, a system control section 50 (derivation section) derives the data amount of data targeted for uplink communication by referencing a buffer in a system storage section 60, for example, and determines whether or not the derived data amount is equal to or greater than a threshold value β (step 2008).

If the derived data amount is less than the threshold value β as a result of the determination, the process goes to step 2005 and the data transmission is continued.

On the other hand, if the derived data amount is equal to or greater than the threshold value β as a result of the determination at step 2008, steps 2002 to 2007 are executed.

That is, whether or not a plurality of peripheral base stations is registered in Activeset is determined (step 2002) and if it is determined that a plurality of peripheral base stations is registered in Activeset, the system control section 50 (determination section) determines whether or not the peripheral base stations registered in Activeset include the peripheral base station, even one, which indicates RABit="1," namely, is congested and is hard to increase the transmission rate (step 2003).

If it is determined that the peripheral base station, even one, indicating RABit="1" is registered in Activeset, the system control section 50 (generation section) generates a RouteUpdate message including "false pilot signal strength" to remove the peripheral base station 100b from Activeset and transmits the message from the DO RF section 30 (transmission section) through an antenna section 10 to the connecting base station 100a (step 2004).

Consequently, the base station 100b is removed from Activeset. The wireless communication terminal 200 executes data transmission (step 2005) and when the data transmission is complete, the wireless communication terminal 200 transmits a RouteUpdate message including the "correct" pilot signal strength between the peripheral base station 100b and the wireless communication terminal 200 (step 2007).

As the processing in FIG. 16 is performed, if the transmission data amount is equal to or greater than the predetermined threshold value β, the peripheral base station which is congested and therefore is not allowed to increase the transmission rate (indicating RABit="1") is removed from Activeset of the connecting base station to perform data communication, and thus the upper limit value of the up data transmission rate is increased in accordance with the processing in FIG. 3. In so doing, the throughput of the up data communication can be enhanced.

Figure 17:
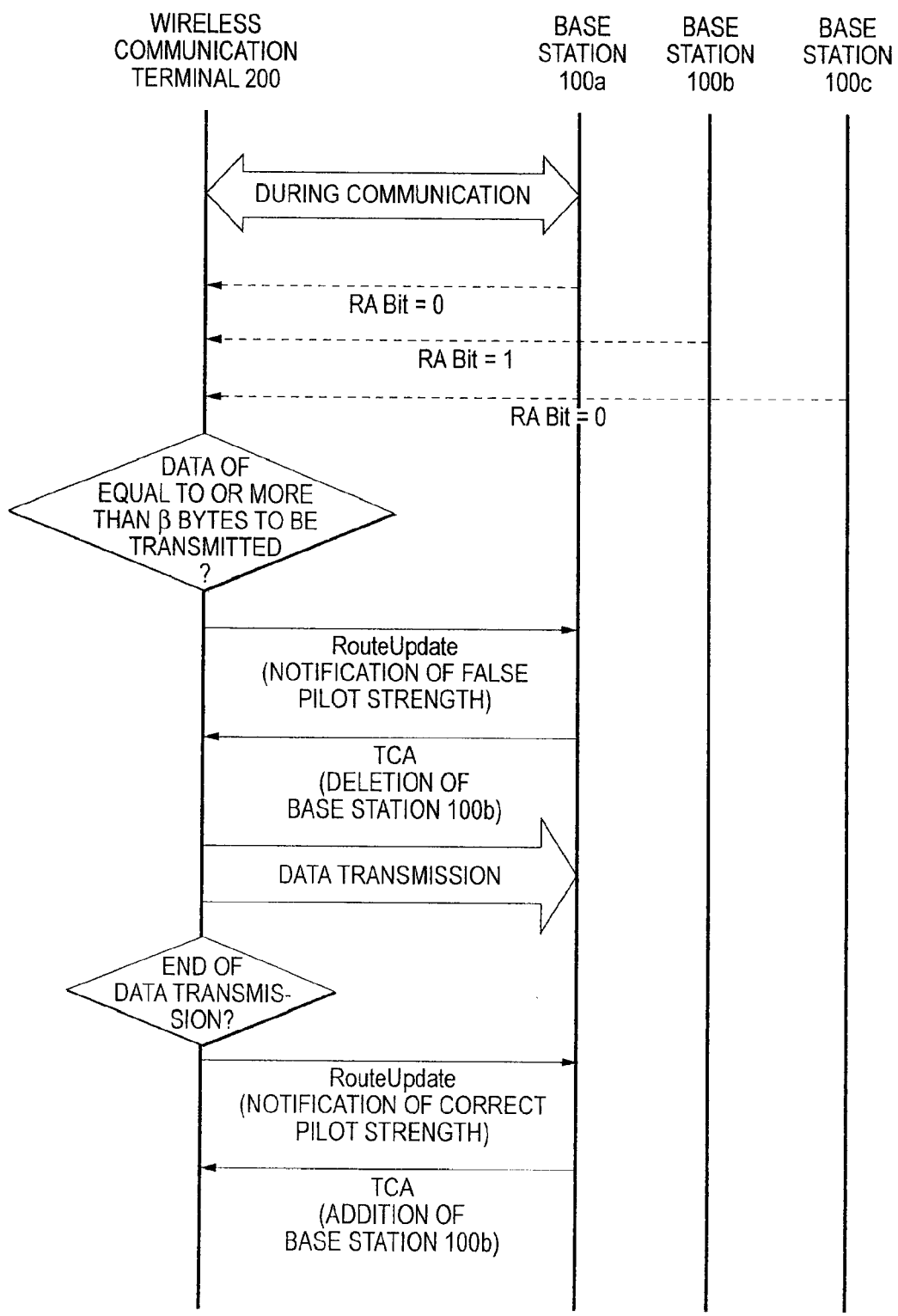
FIG. 17 is a sequence chart at the uplink data transmission time in the seventh embodiment of the invention.

FIG. 17 is a sequence chart at the up data transmission time in the DO system executed by the wireless communication terminal 200.

The wireless communication terminal 200 starts communication with the connecting base station 100a.

If the base station 100b of the peripheral base stations registered in Activeset is congested and therefore enters a state in which the transmission rate cannot be increased and indicates RABit="1," the wireless communication terminal 200 determines whether or not the transmission data amount is equal to or greater than the threshold value β.

To transmit the amount of data equal to or greater than the threshold value β, a RouteUpdate message including the "false pilot signal strength" is generated and is transmitted to the connecting base station 100a to remove the peripheral base station 100b indicating RABit="1" from Activeset.

Upon reception of the RouteUpdate message including the "falsepilot signal strength," the base station 100a determines that the pilot signal strength is less than a threshold value ζ and performs processing of removing the peripheral base station 100b indicating the pilot signal strength from Activeset. A TCA message is sent to the wireless communication terminal 200 to notify that the base station 100b has been removed from Activeset.

The wireless communication terminal 200 performs data communication in this state, namely, in the state in which the base station not allowed to increase the transmission rate (indicating RABit="1") because of congestion is removed.

If it is determined that the data transmission is complete, a RouteUpdate message including the "correct" pilot signal strength between the peripheral base station 100b and the wireless communication terminal 200 rather than the "false" pilot signal strength is transmitted to re-register the base station 100b removed from Activeset, in Activeset.

If the "correct" pilot signal strength is equal to or greater than the threshold value ζ, the connecting base station 100a re-registers the peripheral base station 100b in Activeset.

A TCA message is sent to the wireless communication terminal 200 to notify that the base station 100b has been registered in Activeset.

In the seventh embodiment of the invention described above, in data communication, only if the amount of data equal to or greater than the threshold value β is to be transmitted, the peripheral base station not allowed to increase the transmission rate (indicating RABit="1") because of congestion, of the base stations registered in Activeset is removed from Activeset.

Thus, the following advantage is provided:

To execute data transmission of a small amount that requires a short time, if time is consumed for the Activeset change process (steps 2002 to 2007 in FIG. 16) and the transmission rate is increased, the effect is small. Therefore, the Activeset change process is performed only for transmitting a large amount of data.

In so doing, the throughput of the up data communication can be enhanced.

In the embodiments of the invention, the pilot signal strength (RSSI value) is used to determine the radio wave state with the base station 100, but the carrier to interference wave ratio (C/I value) of pilot signal may be used in place of the pilot signal strength (RSSI value).

In the embodiments of the invention, the hybrid system of the CDMA2000 1x system and the CDMA2000 1xEVDO system for performing wireless communication using the common antenna has been described, but the invention is not limited to it. Wireless communication may be performed using separate antennas.

In the embodiments of the invention, the hybrid system of the CDMA2000 1x system and the CDMA2000 1xEVDO system has been described, but the invention is not limited to it. Any type of communication system may be adopted if the communication system varies the transmission rate according to the congestion state of the base station.

INDUSTRIAL APPLICABILITY

According to the configurations of the invention, the throughput of the wireless communication terminal that can perform communication in a plurality of communication systems can be enhanced and thus the industrial applicability is extremely large.

The invention is not limited to the embodiments described above.

The invention claimed is:

1. A wireless communication terminal comprising:
a switching section for switching between a first communication system in which an upper limit value of a transmission rate varies and a second communication system;
a reception section for receiving an information indicating the upper limit value of the transmission rate in the first communication system, from a base station;
a comparison section for making a comparison between the upper limit value received by the reception section and a predetermined reference value, either at a communication start time or during communication with the base station in the first communication system;
a control section for performing switching control of the switching section so as to perform communication in the second communication system when the upper limit value is lower than the reference value as a result of the comparison by the comparison section; and
a derivation section for deriving a remaining amount of data to be transmitted in the first communication system,
wherein the control section performs the switching control to the second communication system when the upper limit value is lower than the reference value as the result of the comparison by the comparison section, and only when the remaining data amount derived by the derivation section is larger than a predetermined amount.

2. The wireless communication terminal as claimed in claim 1, wherein the reference value is a value at which it is expected that the transmission rate will increase when communication is performed in the second communication system rather than in the first communication system.

3. A wireless communication terminal comprising:
a switching section for switching between a first communication system in which an upper limit value of a transmission rate varies and a second communication system;
a reception section for receiving an instruction information that instructs to vary the upper limit value of the transmission rate in the first communication system, at every predetermined timing from a base station;
a determination section for determining whether or not the instruction information that instructs to lower the upper limit value of the transmission rate is received successively for equal to or more than a predetermined number of times during communication with the base station in the first communication system;
a control section for performing switching control of the switching section so as to perform communication in the second communication system when the instruction information that instructs to lower the upper limit value of the transmission rate is received successively for equal to or more than the predetermined number of times as a result of the determination by the determination section; and
a derivation section for deriving the remaining amount of data to be transmitted in the first communication system,
wherein the control section performs the switching control to the second communication system when the instruction information that instructs to lower the upper limit value of the transmission rate is received successively for equal to or more than the predetermined number of times as the result of the determination by the determination section, and only when the remaining data amount derived by the derivation section is larger than a predetermined amount.

4. The wireless communication terminal as claimed in claim 3, wherein the control section performs the switching control of the switching section when the instruction information that instructs to lower the upper limit value of the transmission rate is received successively for equal to or more than the predetermined number of times as the result of the determination by the determination section, and only when the upper limit value of the transmission rate in the first communication system is lower than a predetermined reference value.

5. The wireless communication terminal as claimed in claim 4, wherein the reference value is a value at which it is expected that the transmission rate will increase when communication is performed in the second communication system rather than in the first communication system.

6. A program embodied in a computer readable medium which enables a computer to perform a process, the program being used with a wireless communication terminal in which communication is performed by switching between a first communication system in which an upper limit value of a transmission rate varies and a second communication system, the process comprising:
a first process for receiving an information indicating the upper limit value of the transmission rate in the first communication system, from a base station;
a second process for making a comparison between the upper limit value received by the reception section and a predetermined reference value, either at a communication start time or during communication with the base station in the first communication system;
a third process for switching from the first communication system to the second communication system when the upper limit value is lower than the reference value as a result of the comparison by the second process; and
a fourth process for deriving a remaining amount of data to be transmitted in the first communication system,
wherein in the third process, the switching from the first communication system to the second communication system is made when the upper limit value is lower than the reference value as the result of the comparison by the second process, and only when the remaining data amount derived by the fourth process is larger than a predetermined amount.

7. The program as claimed in claim 6, wherein the reference value is a value at which it is expected that the transmission rate will increase when communication is performed in the second communication system rather than in the first communication system.

8. A program embodied in a computer readable medium which enables a computer to perform a process, the program being used with a wireless communication terminal in which communication is performed by switching between a first communication system in which an upper limit value of a transmission rate varies and a second communication system, the process comprising:
a first process for receiving an instruction information that instructs to vary the upper limit value of the transmission rate in the first communication system, at every predetermined timing from a base station;
a second process for determining whether or not the instruction information that instructs to lower the upper limit value of the transmission rate is received successively for equal to or more than a predetermined number of times during communication with the base station in the first communication system;

a third process for switching from the first communication system to the second communication system when the instruction information that instructs to lower the upper limit value of the transmission rate is received successively for equal to or more than the predetermined number of times as a result of the determination by the second process; and a fourth process for deriving a remaining amount of data to be transmitted in the first communication system, wherein in the third process, the switching from the first communication system to the second communication system is made when the instruction information that instructs to lower the upper limit value of the transmission rate is received successively for equal to or more than the predetermined number of times as the result of the determination by the second process, and only when the remaining data amount derived by the fourth process is larger than a predetermined amount.

9. The program as claimed in claim 8, wherein in the third process, the switching from the first communication system to the second communication system is made when the instruction information that instructs to lower the upper limit value of the transmission rate is received successively for equal to or more than the predetermined number of times as the result of the determination by the second process, and only when the upper limit value of the transmission rate in the first communication system is lower than a predetermined reference value.

10. The program as claimed in claim 9, wherein the reference value is a value at which it is expected that the transmission rate will increase when communication is performed in the second communication system rather than in the first communication system.

11. A communication method for performing communication in a wireless communication terminal by switching between a first communication system in which an upper limit value of a transmission rate varies and a second communication system, the communication method comprising:

receiving an information indicating the upper limit value of the transmission rate in the first communication system, from a base station;

making a comparison between the upper limit value received from the base station and a predetermined reference value, either at a communication start time or during communication with the base station in the first communication system; and switching from the first communication system to the second communication system when the upper limit value is lower than the reference value as a result of the comparison; and deriving a remaining amount of data to be transmitted in the first communication system when the upper limit value is lower than the reference value as the result of the comparison, wherein only when the derived remaining data amount is larger than a predetermined amount, the switching from the first communication system to the second communication system is made.

12. The communication method as claimed in claim 11, wherein the reference value is a value at which it is expected that the transmission rate will increase when communication is performed in the second communication system rather than the first communication system.

13. A communication method for performing communication in a wireless communication terminal by switching between a first communication system in which an upper limit value of a transmission rate varies and a second communication system, the communication method comprising:

receiving an instruction information that instructs to vary the upper limit value of the transmission rate in the first communication system, at every predetermined timing from a base station;

determining whether or not the instruction information that instructs to lower the upper limit value of the transmission rate is received successively for equal to or more than a predetermined number of times during communication with the base station in the first communication system;

switching from the first communication system to the second communication system when the instruction information that instructs to lower the upper limit value of the transmission rate is received successively for equal to or more than the predetermined number of times as a result of the determination; and deriving a remaining amount of data to be transmitted in the first communication system when the instruction information that instructs to lower the upper limit value of the transmission rate is received successively for equal to or more than the predetermined number of times as the result of the determination, wherein only when the derived remaining data amount is larger than a predetermined amount, the switching from the first communication system to the second communication system is made.

14. The communication method as claimed in claim 13, wherein the switching from the first communication system to the second communication system is made when the instruction information that instructs to lower the upper limit value of the transmission rate is received successively for equal to or more than the predetermined number of times as the result of the determination, and only when the upper limit value of the transmission rate in the first communication system is lower than a predetermined reference value.

15. The communication method as claimed in claim 14, wherein the reference value is a value at which it is expected that the transmission rate will increase when communication is performed in the second communication system rather than the first communication system.

16. A wireless communication terminal that is connected to a connecting base station that holds an information of a peripheral base station as a candidate of handoff destination, the wireless communication terminal comprising:

a reception section for receiving an instruction information that instructs to vary an upper limit value of a transmission rate, from the peripheral base station;

a determination section for determining whether or not an instruction information that instructs to lower the upper limit value of the transmission rate is included in the instruction information received by the reception section;

a generation section for generating a signal to control the information of the peripheral base station when the instruction information that instructs to lower the upper limit value of the transmission rate is included as a result of the determination by the determination section;

a transmission section for transmitting the signal generated by the generation section to the connecting base station; and a derivation section for deriving a data amount of data to be transmitted, wherein the transmission section transmits the signal to control the information of the peripheral base station to the connecting base station when the instruction information that instructs to lower the upper limit value of the transmission rate is included as the result of the determination by the determination section, and only when the data amount derived by the derivation section is larger than a predetermined value.

17. The wireless communication terminal as claimed in claim 16, wherein the signal to control the information of the peripheral base station includes an information to remove the base station transmitting the instruction information that instructs to lower the upper limit value of the transmission rate, from the information of the peripheral base station.

18. The wireless communication terminal as claimed in claim 16, wherein the signal to control the information of the peripheral base station is a value indicating a communication quality between the base station transmitting the instruction information that instructs to lower the upper limit value of the transmission rate and the wireless communication terminal, and the value is below a predetermined reference value.

19. A program embodied in a computer readable medium which enables a computer to perform a process, the program being used with a wireless communication terminal that is connected to a connecting base station that holds an information of a peripheral base station as a candidate handoff destination, the process comprising:
- a first process for receiving an instruction information that instructs to vary an upper limit value of a transmission rate, from the peripheral base station;
- a second process for making a determination whether or not an instruction information that instructs to lower the upper limit value of the transmission rate is included in the instruction information received by the first process;
- a third process for transmitting a signal to control the information of the peripheral base station to the connecting base station when the instruction information that instructs to lower the upper limit value of the transmission rate is included as a result of the determination by the second process; and
- a fourth process for deriving a data amount of data to be transmitted,
- wherein in the third process, the signal to control the information of the peripheral base station is transmitted to the connecting base station when the instruction information that instructs to lower the upper limit value of the transmission rate is included as the result of the determination by the second process, and only when the data amount derived by the fourth process is larger than a predetermined value.

20. The program as claimed in claim 19, wherein the signal to control the information of the peripheral base station includes an information to remove the base station transmitting the instruction information that instructs to lower the upper limit value of the transmission rate, from the information of the peripheral base station.

21. The program as claimed in claim 19, wherein the signal to control the information of the peripheral base station is a value indicating a communication quality between the base station transmitting the instruction information that instructs to lower the upper limit value of the transmission rate and the wireless communication terminal, and the value is below a predetermined reference value.

22. A communication method used with a wireless communication terminal that is connected to a connecting base station that holds an information of a peripheral base station as a candidate handoff destination, the communication method comprising:
- receiving an instruction information that instructs to vary an upper limit value of a transmission rate, from the peripheral base station;
- making a determination whether or not an instruction information to lower the upper limit value of the transmission rate is included in the instruction information received from the peripheral base station;
- transmitting a signal to control the information of the peripheral base station to the connecting base station when the instruction information that instructs to lower the upper limit value of the transmission rate is included as a result of the determination; and
- deriving an amount of data to be transmitted when the instruction information that instructs to lower the upper limit value of the transmission rate is included as the result of the determination,
- wherein only when the derived data amount is larger than a predetermined value, the signal to control the information of the peripheral base station is transmitted to the connecting base station.

23. The communication method as claimed in claim 22, wherein the signal to control the information of the peripheral base station includes an information to remove the base station transmitting the instruction information that instructs to lower the upper limit value of the transmission rate, from the information of the peripheral base station.

24. The communication method as claimed in claim 22, wherein the signal to control the information of the peripheral base station is a value indicating a communication quality between the base station transmitting the instruction information that instructs to lower the upper limit value of the transmission rate and the wireless communication terminal, and the value is below a predetermined reference value.

* * * * *